United States Patent [19]

Katsuyama et al.

[11] Patent Number: 5,701,385
[45] Date of Patent: Dec. 23, 1997

[54] APPARATUS FOR REPLAYING A RECORDING MEDIUM HAVING MEANS FOR DISPLAYING THE CONTENTS OF THE RECORDING MEDIUM AS GRAPHICS IMAGES WHICH INCLUDE A SERIES OF INTRA-PICTURES

[75] Inventors: Akira Katsuyama; Kenji Tomizawa; Shuichi Nagano; Takashi Koya, all of Kanagawa, Japan

[73] Assignee: Sony Corporation, Tokyo, Japan

[21] Appl. No.: 498,018

[22] Filed: Jul. 3, 1995

[51] Int. Cl.$^6$ .................. H04N 5/91; H04N 7/04; H04N 5/917; H04N 5/781
[52] U.S. Cl. .................. 386/106; 386/111; 386/125; 386/126; 345/146; 395/328
[58] Field of Search .................. 358/341, 342, 358/312, 335; 360/69; 369/48; 386/70, 39, 45, 105, 106, 96, 109, 111, 112, 125, 126; 345/115, 118, 146; 395/326, 327, 328, 348; H04N 5/91, 7/04, 7/52, 7/06, 7/08

[56] References Cited

U.S. PATENT DOCUMENTS

| | | | |
|---|---|---|---|
| 4,755,978 | 7/1988 | Kazuyuki et al. | |
| 5,101,364 | 3/1992 | Davenport et al. | 395/152 |
| 5,140,437 | 8/1992 | Yonemitsu et al. | 358/342 |
| 5,341,352 | 8/1994 | Nobuyuki | |
| 5,396,340 | 3/1995 | Ishii et al. | 358/342 |
| 5,446,714 | 8/1995 | Yoshio et al. | 369/48 |
| 5,471,316 | 11/1995 | Sugawara et al. | 358/342 |
| 5,475,499 | 12/1995 | Taguchi | 358/341 |
| 5,497,241 | 3/1996 | Ostrover et al. | 358/341 |
| 5,543,929 | 8/1996 | Mankovitz et al. | 358/335 |
| 5,552,896 | 9/1996 | Yoshida | 358/342 |
| 5,586,237 | 12/1996 | Baecker et al. | 395/133 |

FOREIGN PATENT DOCUMENTS

| | | |
|---|---|---|
| 0 389 878 | 10/1990 | European Pat. Off. |
| 0 453 064 | 10/1991 | European Pat. Off. |
| 0 449 622 | 12/1991 | European Pat. Off. |
| 0 479 188 | 4/1992 | European Pat. Off. |
| 0 479 233 | 4/1992 | European Pat. Off. |
| 0 497 252 | 8/1992 | European Pat. Off. |
| 0 569 244 | 11/1993 | European Pat. Off. |
| 0 569 245 | 11/1993 | European Pat. Off. |
| 0265167 | 4/1988 | United Kingdom. |

Primary Examiner—Tommy P. Chin
Assistant Examiner—David R. Vincent
Attorney, Agent, or Firm—William S. Frommer; Alvin Sinderbrand

[57] ABSTRACT

An apparatus for replaying a disc-shaped recording medium on which first video data where audio data or all of video information for one frame through MPEG has been compressed, and second video data where video information before and after the frame in question has been compressed have been recorded together with discrimination data indicating the kind of the recording medium, includes a receiver, a replay unit and a display data producing unit. The receiver receives a plurality of disc-shaped recording media. The replay unit is selectively equipped with the disc-shaped recording media which have been received in the receiver, with the relative movement with respect to the receiver. The replay unit includes a head for reading data recorded on the loaded disc-shaped recording medium. The replay unit conducts the replay processing of the data read out from the head. The display data producing unit produces a plurality of display data for conducting a plurality of display indicating the contents recorded on the respective disc-shaped recording media which have been received in the receiver within one screen, on the basis of data or discrimination data recorded on the recording medium such as the first video data or menu data sequentially read out by the reading unit from the disc-shaped recording media which have been loaded into the replay unit.

14 Claims, 30 Drawing Sheets

FIG. 1

| physical format | CD-ROM(XA) |
|---|---|
| digital·video | MPEG1 conformation<br><br>pixel dimension (pixel number)/frame frequency :<br>    352×240/29.97Hz(NTSC)<br>    352×240/23.976Hz<br>    352×288/25Hz(PAL)<br><br>data transfer rate :<br>    maximum 1.152Mbit/sec |
| digital·audio | MPEG1<br><br>sampling frequency : 44.1KHz<br><br>data transfer rate : 224Kbit/sec (track 2 and subsequent tracks)<br>64, 96, 128, 192, 224, 384Kbit/sec (track 1) |
| replay time | maximum 74 minutes |
| pixel number of still picture | standard level : 352×240(NTSC)<br>                 352×288(PAL)<br>high-Resolution level : 704×480(NTSC)<br>                       704×576(PAL) |
| replay type | normal replay, slow, pause, etc<br>menu replay using playback control |
| video signal output | NTSC/PAL |

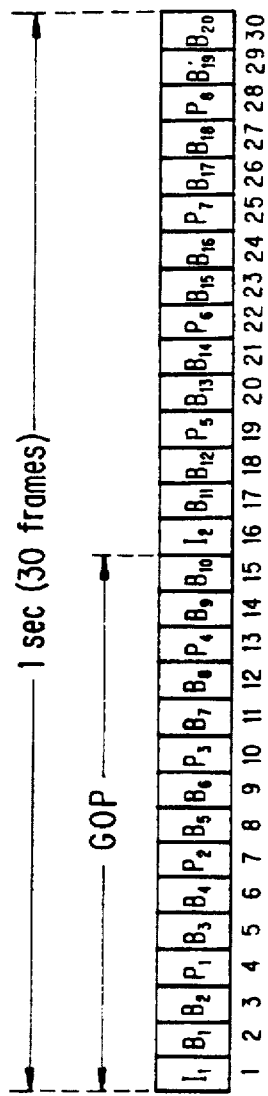
FIG.2A
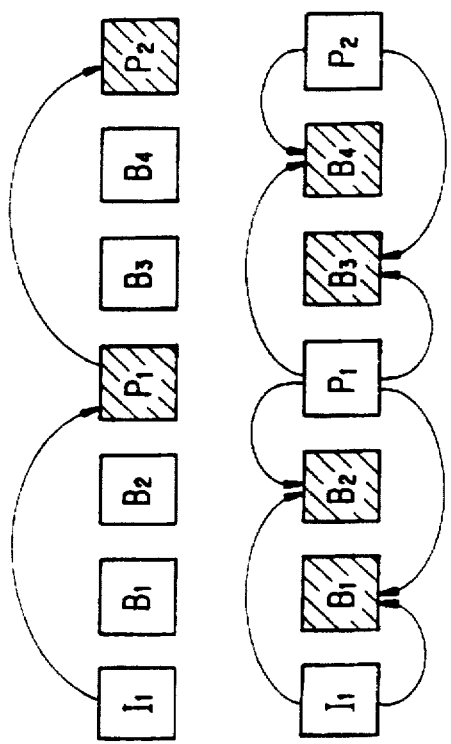
FIG.2B
FIG.2C
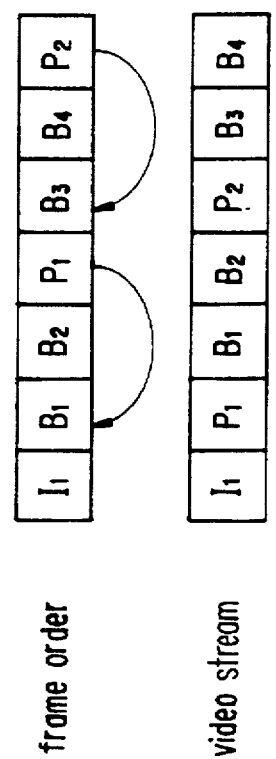
FIG.2D
FIG.2E basic structure of sector one example of video sector one example of audio sector

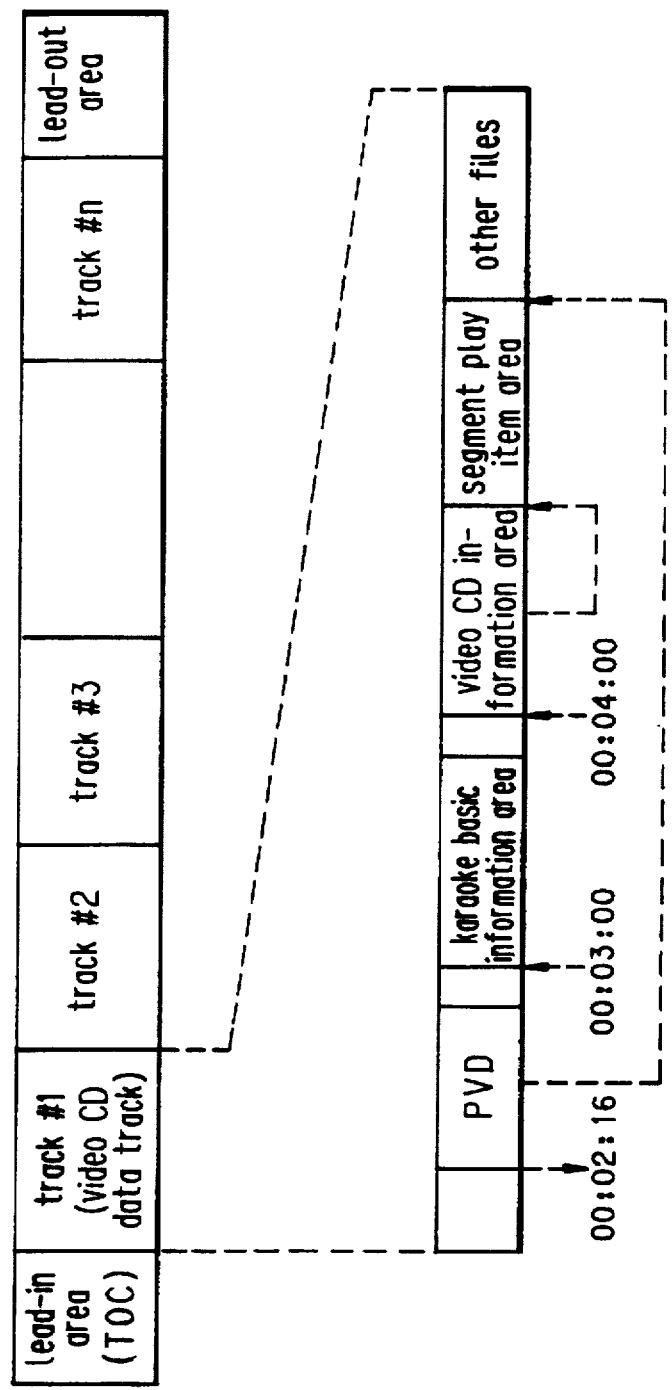
FIG. 6A CD-DA
FIG. 6B video CD video CD directory structure (Ver2.0)

FIG. 8
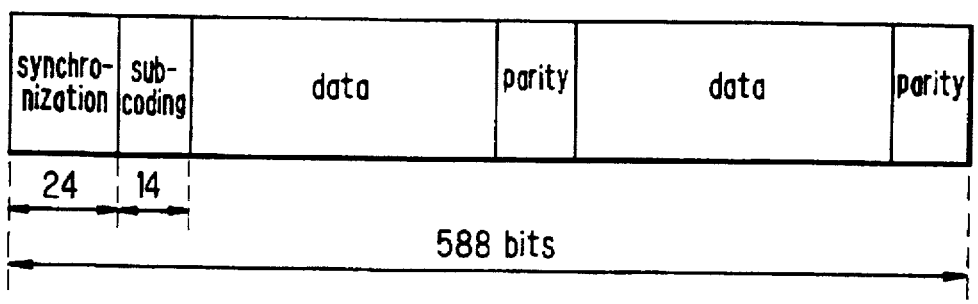
FIG. 9A
| frame | sub-coding | | | | | | |
|---|---|---|---|---|---|---|---|
| 98n+1 | synchronous pattern | | | | | | |
| 98n+2 | synchronous pattern | | | | | | |
| 98n+3 | $P_1$ | $Q_1$ | $R_1$ | $S_1$ | $T_1$ | $U_1$ | $V_1$ | $W_1$ |
| 98n+4 | $P_2$ | $Q_2$ | $R_2$ | $S_2$ | $T_2$ | $U_2$ | $V_2$ | $W_2$ |
| ⋮ | ⋮ | ⋮ | ⋮ | ⋮ | ⋮ | ⋮ | ⋮ |
| 98n+97 | $P_{95}$ | $Q_{95}$ | $R_{95}$ | $S_{95}$ | $T_{95}$ | $U_{95}$ | $V_{95}$ | $W_{95}$ |
| 98n+98 | $P_{96}$ | $Q_{96}$ | $R_{96}$ | $S_{96}$ | $T_{96}$ | $U_{96}$ | $V_{96}$ | $W_{96}$ |
| 98(n+1)+1 | | | | | | | |
FIG. 9B
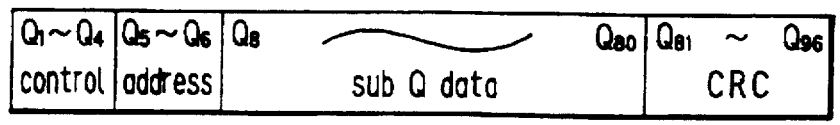

FIG. 11

TOC structure (example of 6-track disc)

| TNO | block | POINT | PMIN, PSEC, PFRAME | |
|---|---|---|---|---|
| 00 | n | 01 | 00.02.32 | start point of track #1 |
| | n+1 | 01 | 00.02.32 | |
| | n+2 | 01 | 00.02.32 | |
| | n+3 | 02 | 10.15.12 | start point of track #2 |
| | n+4 | 02 | 10.15.12 | |
| | n+5 | 02 | 10.15.12 | |
| | n+6 | 03 | 16.28.63 | start point of track #3 |
| | n+7 | 03 | 16.28.63 | |
| | n+8 | 03 | 16.28.63 | |
| | n+9 | 04 | . | |
| | n+10 | 04 | . | |
| | n+11 | 04 | . | |
| | n+12 | 05 | . | |
| | n+13 | 05 | . | |
| | n+14 | 05 | . | |
| | n+15 | 06 | 49.10.03 | start point of track #6 |
| | n+16 | 06 | 49.10.03 | |
| | n+17 | 06 | 49.10.03 | |
| | n+18 | A0 | 01.20.00 | track number of first track on disc |
| | n+19 | A0 | 01.20.00 | |
| | n+20 | A0 | 01.20.00 | |
| | n+21 | A1 | 06.00.00 | track number of last track on disc |
| | n+22 | A1 | 06.00.00 | |
| | n+23 | A1 | 06.00.00 | |
| | n+24 | A2 | 52.48.41 | start point of lead-out track |
| | n+25 | A2 | 52.48.41 | |
| 00 | n+26 | A2 | 52.48.41 | |
| 00 | n+27 | 01 | 00.02.32 | repeat |
| | n+28 | 01 | 00.02.32 | |
| | . | . | . | |

FIG. 12

PVD (basic volume descriptor) structure

| byte position | byte size | contents |
|---|---|---|
| 2 | 5 | volume structure standard ID |
| 9 | 32 | system recognitor |
| 41 | 32 | volume recognitor |
| 123 | 2 | volume number of album |
| 127 | 2 | album set sequence number |
| 131 | 2 | logic block size |
| 137 | 4 | pass table |
| 141 | 8 | address of pass table |
| 157 | 34 | route directory record |
| 191 | 128 | album recognitor |
| 319 | 128 | publisher recognitor |
| 447 | 128 | author recognitor |
| 575 | 128 | application recognitor |
| 703 | 32 | copywrite file name |
| 740 | 32 | summary file name |
| 777 | 32 | catalogue file name |
| 814 | 16 | manufacture date |
| 831 | 16 | correction date |
| 848 | 16 | expiration date |
| 865 | 16 | effective date |
| 882 | 1 | file structure standard version number |
| 1025 | 26 | XA label code |

FIG. 14 disc information structure in video CD information area

| byte position | byte size | contents |
|---|---|---|
| 1~8 | 8 | system recognitor |
| 9~10 | 2 | version number |
| 11~26 | 16 | album recognitor |
| 27~28 | 2 | volume number of album |
| 29~30 | 2 | album set sequence number |
| 31~43 | 13 | moving picture track size map |
| 44 | 1 | status flag |
| 45~48 | 4 | PSD size |
| 49~51 | 3 | first segment address |
| 52 | 1 | offset multiplier |
| 53~54 | 2 | List ID number |
| 55~56 | 2 | segment play item number |
| 57~2036 | 1980 | segment play item content table |
| 2037~2048 | 12 | reserved |

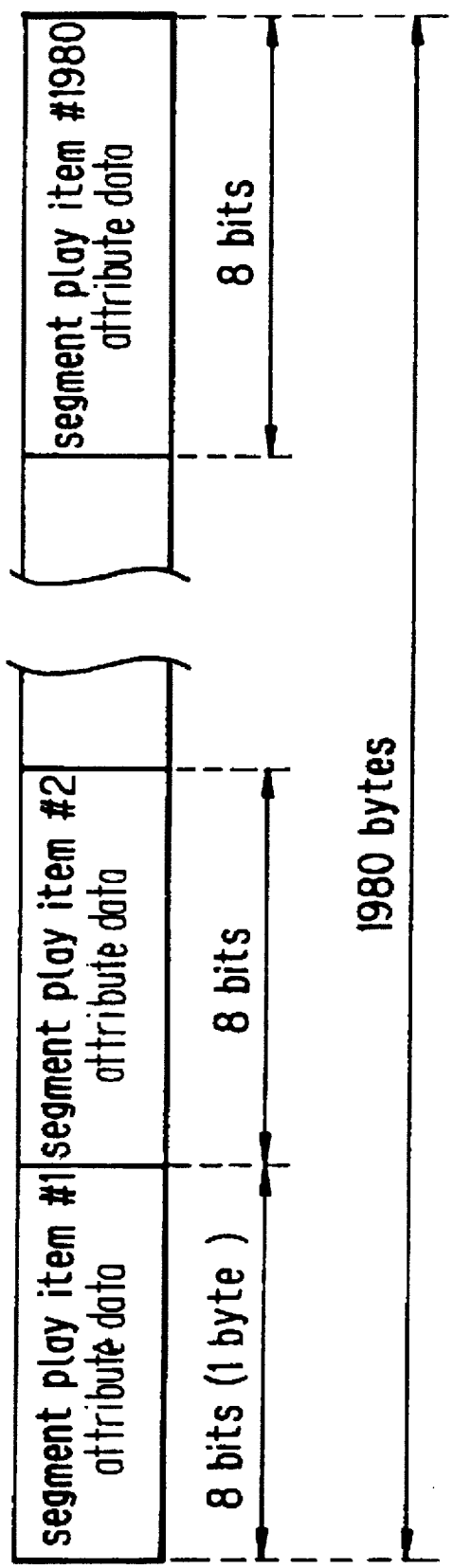

FIG. 16

(list ID number = n)

sector address

| | | | |
|---|---|---|---|
| 00:04:02 | start up offset | $0000 | 2 bytes |
| | list ID1 offset | $0000 | 2 bytes |
| | list ID2 offset | $xxxx | 2 bytes |
| | ⋮ | ⋮ | ⋮ |
| | list IDn offset | $xxxx | 2 bytes |
| | unused list ID | $FFFF | 2 bytes |
| | ⋮ | | |
| 00:04:33 | unused list ID | $FFFF | 2 bytes |

32 sectors

FIG. 17

| | |
|---|---|
| play list header | 1 byte |
| number of items | 1 byte |
| list ID number | 2 bytes |
| previous list offset | 2 bytes |
| next list offset | 2 bytes |
| return list offset | 2 bytes |
| playing time | 2 bytes |
| play item weight time | 1 byte |
| auto pause weight time | 1 byte |
| play item #1 number (PIN#1) | 2 bytes |
| ⋮ | ⋮ |
| play item #N number (PIN#N) | 2 bytes |

FIG. 18 play item number definition

| play item number (PIN) | meaning |
|---|---|
| PIN = 0 or 1 | nothing to be replayed |
| PIN = 2 ~ 99 | replay of track designated by PIN in tracks #2 ~ #99 |
| PIN = 100 ~ 599 | replay starting from entry point designated by (PIN-100) in entry table |
| PIN = 600 ~ 999 | undefined |
| PIN = 1000 ~ 2979 | replay of segment play item designated by (PIN-999) in segment play items #1 ~ #1980 |
| PIN = 2980 ~ $FFFF | undefined |

FIG. 19

| | |
|---|---|
| selection list header | 1 byte |
| unused | 1 byte |
| selection branch number (NOS) | 1 byte |
| first number of selection branch (BSN) | 1 byte |
| list ID number | 2 bytes |
| previous list offset | 2 bytes |
| next list offset | 2 bytes |
| return list offset | 2 bytes |
| default list offset | 2 bytes |
| time-out list offset | 2 bytes |
| wait time until time-out | 1 byte |
| loop count and jump timing | 1 byte |
| play item number (PIN) | 2 bytes |
| selection #BSN offset | 2 bytes |
| ⋮ | |
| selection #(BSN+NOS−1) offset | 2 bytes | all disc digest all disc digest

FIG. 26A disc digest

| DISC 3 DIGEST | | ▷▷| |
|---|---|---|
| 1 | 2 | 3 |
| 4 | 5 | 6 |
| 7 | 8 | 9 |

FIG. 26B track digest

| TRACK 4 DIGEST | | |
|---|---|---|
| 1 | 2 | 3 |
| 4 | 5 | 6 |
| 7 | 8 | 9 |

APPARATUS FOR REPLAYING A RECORDING MEDIUM HAVING MEANS FOR DISPLAYING THE CONTENTS OF THE RECORDING MEDIUM AS GRAPHICS IMAGES WHICH INCLUDE A SERIES OF INTRA-PICTURES

BACKGROUND OF THE INVENTION

The present invention relates to an apparatus for replaying a recording medium, such as a disc, and more particularly to an apparatus for providing a plurality of display images to indicate the contents of the recording medium.

There is a variety of disc media of a so-called read-only type, such as a compact disc (hereinafter referred to as "CD-DA") on which a digital audio signal has been recorded. The CD-DA has digital audio data recorded thereon and allows a listener to enjoy music, etc. with a high tone quality. As one type of the CD-DA, there has been also known a CD-G (CD-Graphics) on which still image data can be additionally recorded within sub-code data.

Furthermore, as one type of a so-called CD-ROM, a video CD has been also developed on which audio data as well as moving picture data is recorded.

As a replay apparatus, there has been developed a changer apparatus which is capable of accommodating not only a single disc but also a plurality of discs therein, and of selectively replaying the accommodated discs. Likewise, the changer apparatus of a video CD adaptive type has been developed.

In the case where a plurality of discs have been loaded in a disc storage unit in a changer apparatus using the video CD, the user cannot remember at which position which disc has been inserted in the disc storage unit.

Usually, the selection of a disc to be replayed is performed by the designation of the storage position of the disc. For example, in the case of providing a plurality of trays, a tray No. is set as a disc No., and when the user conducts the replay operation of [disc 2], the disc loaded in the second tray is selected and replayed.

For that reason, if it cannot be recognized which disc has been inserted at which storage position, the user feels very inconvenienced when operating the replay apparatus.

SUMMARY OF THE INVENTION

It is therefore an object of the present invention to provide an apparatus for replaying a disc-shaped recording medium which solves the above-mentioned problem.

It is another object of the present invention to provide an apparatus for replaying a recording medium which solves the above-mentioned problem.

According to the present invention, there is provided an apparatus for replaying a disc-shaped recording medium on which video data or audio data are recorded together with discrimination data indicating the kind of the recording medium, including a receiver, a reading unit and a display data producing unit. The receiver receives a plurality of disc-shaped recording media. The reading unit reads data recorded on the disc-shaped recording medium which is received in the receiver. The display data producing unit produces display data for providing a plurality of display images on one screen indicating the contents recorded on the respective disc-shaped recording media which have been received in the receiver, on the basis of data sequentially read out by the reading unit from a plurality of disc-shaped recording media.

According to another aspect of the present invention, there is provided an apparatus for replaying a disc-shaped recording medium on which first video data where audio data or all of video information for one frame has been compressed, and second video data where video information before and after the compressed frame has been recorded together with discrimination data indicating the kind of the recording medium. The replay apparatus includes a receiver, a replay unit and a display data producing unit. The receiver receives a plurality of disc-shaped recording media. The replay unit is selectively equipped with the disc-shaped recording media which have been received in the receiver. The replay unit includes a reading unit for reading data recorded on the loaded disc-shaped recording medium. The replay unit subjects data read by the reading unit to a replay processing. The display data producing unit produces a plurality of display images on one screen indicating the contents recorded on the respective disc-shaped recording media which have been received in the receiver, on the basis of data sequentially read out by the reading unit from the disc-shaped recording media.

According to yet another aspect of the present invention, there is provided an apparatus for replaying a recording medium. A plurality of recording media having the same outer diameter, on which data of a different type has been recorded, have been loaded into the replay apparatus. This data, as well as discrimination data indicating the format of data recorded on the recording medium, has been recorded on the recording medium. The replay apparatus includes a receiver, a replay unit and a display data producing unit. The receiver receives a plurality of recording media. The recording medium received in the receiver is selectively loaded into the replay unit. The replay unit includes a reading unit for reading data and discrimination data recorded on the loaded recording medium. The display data producing unit conducts the replay operation of the recording medium sequentially loaded into the replay unit by the replay unit on the basis of discrimination data read out by the reading unit, and produces display data for providing a plurality of display images on one screen indicating the contents recorded on the respective recording media which have been received in the receiver, on the basis of data sequentially read out by the reading unit from the recording media which have sequentially been loaded into the replay unit.

According to the present invention, display data for displaying the contents recorded on the recording medium is produced on the basis of data recorded on the plurality of recording media loaded into the replay apparatus. As a result, the contents recorded on the respective recording media, respectively, can be confirmed on one display screen shown on the display apparatus. In this situation, the user is free from a troublesome operation of sequentially replaying the recording medium in order to confirm the contents of the respective recording media one by one.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings, FIG. 1 is an explanatory diagram showing a format of the XA type of a video CD;

FIGS. 2A to 2E are explanatory diagrams showing video data of the video CD;

FIGS. 6A and 6B are explanatory diagrams showing the structure of the disc of the video CD;

FIG. 8 is an explanatory diagram showing the frame structure of the disc;

FIGS. 9A and 9B are explanatory diagrams showing a subcode data structure;

FIG. 11 is an explanatory diagram showing TOC data;

FIG. 12 is an explanatory diagram showing PVD of the video CD;

FIG. 14 is an explanatory diagram showing disc information of the video CD;

FIG. 15 is an explanatory diagram showing a table of segment play item contents in the disc information of the video CD;

FIG. 16 is an explanatory diagram showing a list ID offset table of the video CD;

FIG. 17 is an explanatory diagram showing a play list of the video CD;

FIG. 18 is an explanatory diagram showing a play item number of the video CD;

FIG. 19 is an explanatory diagram showing a selection list of the video CD;

FIGS. 26A and 26B are explanatory diagrams showing other digest displays which can be realized in accordance with the present invention;

DETAILED DESCRIPTION OF THE PREFERRED EMBODIMENTS

Hereinafter, a description will be given of an apparatus for replaying a recording medium in accordance with the present invention, with reference to the accompanying drawings.

As an embodiment of the present invention, an example of a replay apparatus which enables the replay of video/audio in the video CD, the CD-DA and the CD-G will be described. With respect to the video CD, there exists a disc to which a playback control function is added. The replay apparatus of this embodiment is adapted to such video CD.

The description will be made in the order stated below.

[I. Data Structure of Video CD]
1. Data Format
   a. Video Data
   b. Audio Data
   c. Management Data
2. Track Structure
3. Sector Structure
4. Arrangement of Data on Disc
5. TOC and Sub-code
6. Directory Structure
7. Video CD Data Track
   a. PVD (Basic Volume Descriptor)
   b. Video CD Information
   -b1- Disc Information
   -b2- Entry Table
   -b3- List ID Offset Table
   -b4- PSD (Play Sequence Descriptor)
      *Play List
      *Selection List
      *End List
   c. Segment Play Item
[II. Playback Control (PBC)]
1. List Structure
2. Embodiment
[III. Structure of a Replay Apparatus]
1. Appearance
2. Circuit Block
[IV. All Disc Digest Operation]
1. First Example of Operation Processing
2. Second Example of Operation Processing
[V. Fast Forwarding Operation at the time of All Disc Digest Display]
1. First Example of Operation Processing
2. Second Example of Operation Processing

[I. Data Structure of Video CD]
1. Data Format

The video CD standard is designed in such a manner that the standardized MPEG (Moving Picture Experts Group)

system is applied as a high-efficiency coding technique so that a moving picture and audio of 60 minutes or longer can be replayed from the CD-ROM disc. The video CD has the same physical configuration as a CD-DA and CD-ROM disc. In other words, the outer diameter of the video CD is 12 cams in the CD-DA and CD-ROM, and the thickness of a substrate of the video CD is 1.2 mm. As a result, the video CD standard is applicable to a domestic software such as music, movie, Karaoke and so on, and also can be used with an education software, an electronic publication, an entertainment software and so on in combination with a still picture.

In such video CD, the moving picture data is compressed in the MPEG system, and the moving picture data thus compressed is superimposed on audio data before being recorded on the video CD. Further, management data necessary for the replay is recorded in a predetermined area.

FIG. 1 shows the data format of a video CD XA type (extended Architecture).

a. Video Data

Figure 3:
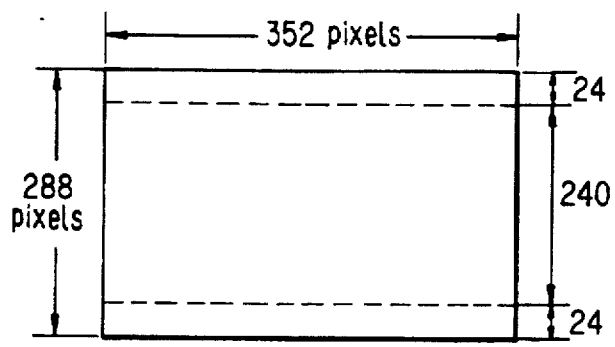
FIG. 3 is an explanatory diagram showing an image size of the video CD.

In the recording format of an image and audio, as is apparent from FIG. 1, 1.152 Mbit/sec data transfer rate is assigned to video data whereas 64 to 384 Kbit/sec are assigned to audio data. The pixel dimensions of video data (moving picture) are 352×240 pixels in the case of an NTSC signal (29.9 Hz) and a film (23.976 Hz), and 352×288 pixels in the case of a PAL signal (25 Hz), as also shown in FIG. 3.

The pixel number of a still picture is 352×240 pixels at a standard level and 704×480 pixels at a high-definition level in the case of an NTSC system. It is 352×288 pixels at a standard level and 704×576 pixels at a high-definition level in the case of a PAL system.

The compression coding of video data of a moving picture through the MPEG system is executed as stated below. If a video signal before compression is for the NTSC system, one second is constituted by video signals of 30 frames.

In the MPEG system, the respective video signals of one frame are divided into a plurality of blocks (that is, 330 blocks by providing laterally 22-block division and longitudinally 15-block division) in a direction of a plane. The data in the respective blocks is subjected to DCT (Discrete Cosine Transform), and then re-quantified for further reducing the number of bits (high-band components are set to 0). The blocks are rearranged in the zigzag manner from the left and upper block in one frame, and then subjected to a run-length coding for further compressing the number of bits.

Thus, in the respective frames of the compressed video signals, the frames located before and after on the time line are very similar to each other in terms of video information, and information is further compressed by utilizing this fact so that video data of three types in one frame, which are different in the degree of compression, is produced. They are called an i-picture (Intra Picture), a p-picture (Predictive Picture) and a b-picture (Bidirectional Picture).

In each of 30 frames within one minute, the i-picture, the p-picture and the b-picture are arranged as shown in FIG. 2A. For example, in this case, frames of i-pictures $I_1$ and $I_2$ are disposed at 15-frame intervals and 8 p-pictures $P_1$ to $P_8$ and 20 b-pictures $B_1$ to $B_{20}$ are disposed, respectively, as shown in FIG. 2A. An interval between a certain i-picture and a frame immediately before a succeeding i-picture is called GOP (Group of Picture).

The i-picture is normal image data which has been encoded by the DCT conversion as described above.

The p-picture is, as shown in FIG. 2B, produced by encoding the nearest i-picture or p-picture with a movement compensation. For example, the p-picture $P_1$ is produced from the i-picture $I_1$, and the p-picture $P_2$ is produced from the p-picture $P_1$. For that reason, the p-picture becomes data compressed more than the i-picture. In the case of producing the i-picture or p-picture subsequent to the first i-picture or p-picture, if an error is caused when producing the i-picture or p-picture, the error is propagated.

The b-picture is produced by using both the past and future i-pictures or p-pictures as shown in FIG. 2C. For example, the b-pictures $B_1$, and $B_2$ are produced by using the i-picture $I_1$, and the p-picture $P_1$, and the b-pictures $B_3$ and $B_4$ are produced by using the p-picture $P_1$ and the p-picture $P_2$.

The b-picture is data which has been most compressed. Because the b-picture is not referred to for producing data, no error is propagated.

In the MPEG algorithm, the position and synchronization of the i-picture may be selected, and this selection is determined from such circumstances as the degree of a random access or a scene cut. For example, if importance is given to the random access, two i-pictures are required for at least one second, as shown in FIG. 2A.

Further, the frequency of the p-picture and the b-pictures can be selected. This is set in accordance with the storage capacity of an encoder or the like. The encoder in the MPEG system rearranges a video data stream and outputs it so that the decoder has an excellent efficiency in decoding the encoded data.

For example, in FIG. 2A, a frame order to be displayed (that is, the output order of the decoder) is set as indicated by frame numbers shown in the lower portion of FIG. 2A. In order for the decoder to compose the b-pictures, a p-picture forming a reference is required at a point before the b-picture. For that reason, at the encoder side, the frame order shown in FIG. 2D is rearranged as shown in FIG. 2E, and then transmitted as a video data stream.

b. Audio Data

The MPEG audio data format deals with an encoding speed of a wide range from 32 to 448 kbit/sec. In view of the facility of software manufacture and the enhancement of a tone quality, the encoding speed of track 2 or the following tracks is set to 224 Kbit/sec.

The sampling frequency is 44.1 KHz as in the CD-DA.

c. Management Data

Management data for conducting a variety of controls for the operation of replaying video data and audio data is recorded on the video CD, in addition to video data and audio data.

In other words, the TOC (Table Of Contents) data and the Sub-code are recorded on the video CD as in the CD-DA, which represents the number of tracks, the start position (absolute time) of each track and so on.

Further, in the video CD, the track 1 is used as a control data track where a variety of management information is recorded. The playback control operation, which will be described later, is also conducted by using data within the control data track.

This management data will be described, respectively, later.

2. Track Structure

Figure 4A:
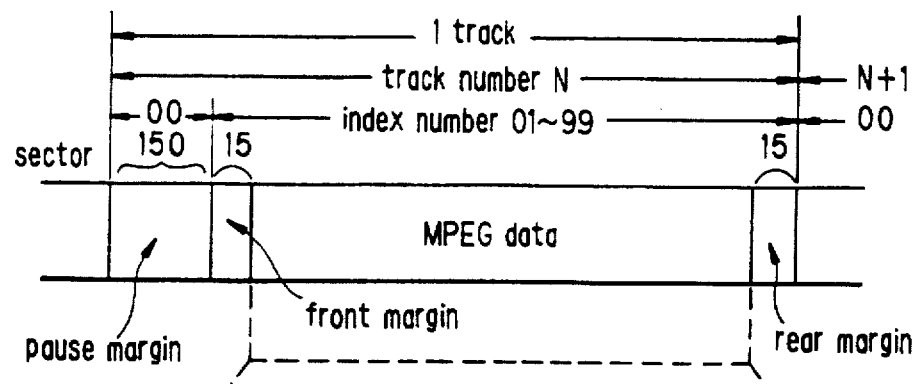
FIGS. 4A and 4B are explanatory diagrams showing the track structure of the video CD.

The data structure of a track on which, for example, video data and audio data which form unit data of one tune are recorded in music or the like is structured as shown in FIG. 4A.

It is assumed that retrieval is made by the track number as in the CD-DA, and a head of one track is provided with a pause margin of 150 sectors.

Further, 15 sectors subsequent to the pause margin is a front margin and the final 15 sectors of the track is a rear margin, both forming empty data areas.

Figure 4B:
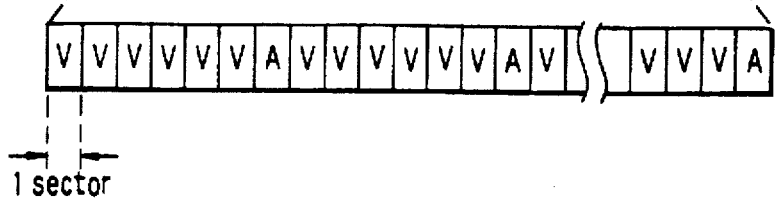

The MPEG data area is formed between the front margin and the rear margin. In the MPEG data area, a sector V forming video data and a sector A forming audio data are time multiplexed through interleaving and recorded at the ratio of 6:1 on average, as shown in FIG. 4B.

3. Sector Structure

Figure 5A:
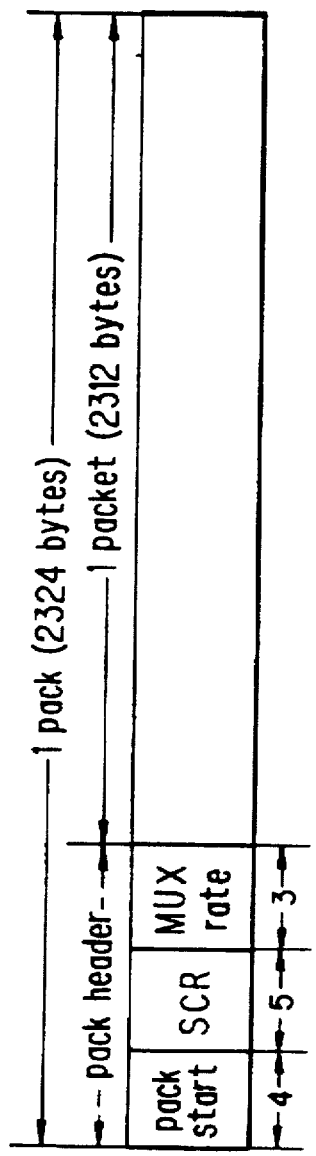
FIGS. 5A to 5C are explanatory diagrams showing examples of the sector structure of the video CD.
Figure 5B:
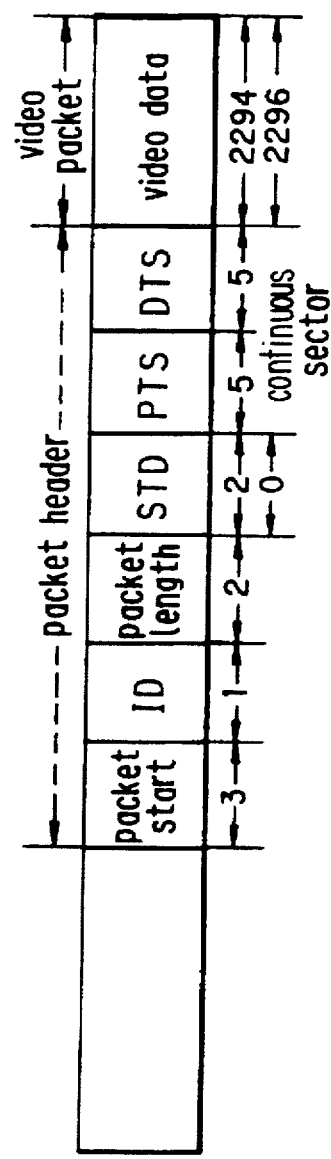
Figure 5C:
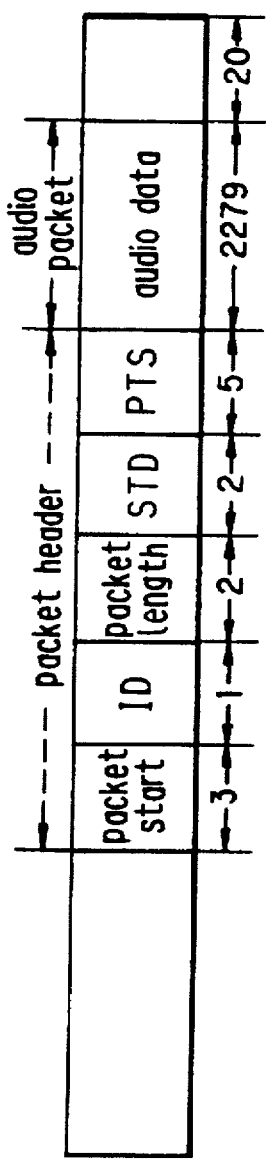

The structure of a sector which forms one data unit within a track is shown in FIGS. 5A to 5C.

FIG. 5A shows a basic structure of the sector. One sector is formed of a pack of 2324 bytes consisting of a pack header and pack data.

A pack header of 12 bytes is disposed at the head of the sector, and the remaining 2312 bytes constitute one packet.

In the pack header, a pack start code of 4 bytes is first arranged, a system clock reference (SCR) of 5 bytes is subsequently arranged, and an MUX rate of 3 bytes is finally arranged.

The system clock reference (SCR) is a code which means one sort of absolute time, and a PTS (Presentation Time Stamp: Image Output Start Time) which will be described later is determined with the SCR as a reference.

The SCR is determined as SCR(I)=C+i*1200. Reference symbol i is an index number of a sector within a video data stream and set to be 0 at the top front margin portion. C is a constant which is 0. 1200 is a value (90000/75=1200) when the system clock is 90 KHz at 75 Hz sector.

The pack header is disposed in all the V sectors of video data. Such a pack header is arranged in the sector constituted by one pack. However, in the case where a sector is for recording video data, a packet of 2312 bytes subsequent to the pack header is constituted as shown in FIG. 5B.

First, a packet header of 18 bytes is disposed subsequently to the pack header. The first 3 bytes of the packet header are set as a packet start code. Subsequently, an ID of one byte, a packet length of 2 bytes, an STD (System Target Decoder) of 2 bytes, a PTS of 5 bytes and a DTS (Decoding Time Stamp) of 5 bytes are recorded in the stated order. The PTS which represents an image output start time is set so as to synchronize with audio data. The DTS represents a decoding start time.

A video packet is constituted by 2294 bytes subsequent to the packet header, and actual video data is recorded in the video packet. In other words, as described above, the video data stream of the i-picture, the p-picture and the b-picture is recorded in the video packet.

In the section where the video sectors are continuous, in the first video sector, the video packet is 2294 bytes, but in the subsequent continuous video sectors, the STD is omitted from the packet header with the result that the video packet is extended to 2296 bytes.

In the case where audio data is recorded in the sector, a packet of 2312 bytes subsequent to the pack header is formed as shown in FIG. 5C.

A packet header is disposed subsequent to a pack header as in the video sector. The packet header is constituted by 13 bytes consisting of a packet start code of 3 bytes, an ID of one byte, a packet length of 2 bytes, an STD of 2 bytes and a PTS of 5 bytes.

2279 bytes are assigned to the audio packet so that the compressed digital audio data is recorded in the packet. An empty area of 20 bytes is added at the back of the audio packet to constitute one pack of 2324 bytes (one sector).

The sector is thus formed, and time information for synchronization is the SCR, the DTS and the PTS. In other words, as shown in FIG. 4B, because video sectors and audio sectors are arranged on one track in time sequence, the synchronization of these sectors is necessary. The SCR, the DTS and the PTS are used for conducting this synchronized processing.

In other words, the DTS in each sector represents a time when the decoding of the video packet or audio packet starts with the SCR as a reference clock. Furthermore, the PTS represents the time when a display or audio output is conducted.

Thus, the video sector and the audio sector are synchronized with each other using the above time information.

3. Arrangement of Data on a Disc

The disc structures of the CD-DA and the video CD are shown in FIGS. 6A and 6B, respectively.

In the CD-DA, as shown in FIG. 6A, a lead-in area is arranged on the innermost peripheral side of the disc, on which TOC data is recorded. The TOC data includes the start positions of the respective tracks, the number of tracks, a musical performance time and so on recorded in the lead-in area.

Subsequent to the lead-in area, track data is recorded as track #1 to track #n, and a lead-out area is arranged at the outermost peripheral position. On the respective tracks, digital audio data of 16-bit quantization at a sampling rate of 44.1 KHz is recorded together with sub-code data.

On the other hand, the disc structure of the video CD is shown in FIG. 6B. Substantially as in the CD-DA, the video CD has a lead-in area which is disposed at the innermost peripheral side of the disc, on which TOC data is recorded. Track #1 to track #n are recorded subsequently to the lead-in area, and a lead-out area is arranged at the outermost peripheral position.

In the case of the video CD, the track #1 is not used for recording actual video data or audio data as the first track, but used as a control data track.

The actual video data or audio data is recorded on the track #2 to the track #n. In other words, the track #2 to the track #n are constituted by the video sector and audio sector described with reference to FIGS. 5A to 5C, as shown in FIGS. 4A to 4B.

Also, in the case of the video CD, a track on which only audio data has been recorded can be provided. In this case, digital audio data of 16-bit quantization at a sampling rate of 44.1 KHz as in the CD-DA is recorded.

Both the CD-DA and the video CD can provide a maximum of 99 tracks. Therefore, in the case of CD-DA, 99 tunes can be recorded at the maximum. In the video CD, 98 sequences can be recorded at the maximum. The sequence means one sequential section of a moving picture, and in the case where an image such as Karaoke has been recorded, one tune (one track) is one sequence.

On the video CD data track using the track #1, as indicated in the lower portion of FIG. 6B, a PVD (basic volume descriptor), a video CD information area, a segment play item area and other files (CD-I(CD-Interactive) application program and so on) are provided. They will be described later.

5. TOC data and Sub-code

In the video CD and the CD-DA, the TOC data recorded in the lead-in area and the sub-code will be described.

The minimum unit of data recorded in the video CD and the CD-DA is one frame. One block is constituted by 98 frames.

The structure of one frame is shown in FIG. 8. One frame includes 588 bits, and the leading 24 bits are synchronous data, and the subsequent 4 bits are sub-code data. Then, data and parity are arranged at the back of the sub-code data area.

Ninety-eight frames thus organized form one block, and sub-code data taken from 98 frames is collected together, thereby forming sub-code data of one block as shown in FIG. 9A.

In the leading first and second frames (frame 98n+1, frame 98n+2) of 98 frames, sub-code data forming a synchronous pattern is recorded. The respective 96-bit channel data, that is, the respective sub-code data of P, Q, R, S, T, U, V and W are formed by the third frame through the 98th frame (frame 98n+3 to frame 98n+98).

Among them, a P-channel and a Q-channel are used for management of access and so on. Here, the P-channel represents only a pause portion between the adjacent tracks, and more fine control is conducted by Q-channels ($Q_1$ to $Q_{96}$). The Q-channel data of 96 bits is constituted as shown in FIG. 9B.

First, 4 bits of $Q_1$, to $Q_4$ is control data and used for discriminating the number of channels of audio, an emphasis, a CD-ROM and so on.

In other words, the control data of 4 bits are defined as stated below.

| | |
|---|---|
| [0***] | 2-channel audio |
| [1***] | 4-channel audio |
| [*0**] | CD-DA |
| [*1**] | CD-ROM |
| [**0*] | Digital copy disable |
| [**1*] | Digital copy enable |
| [***0] | No pre-emphasis exists |
| [***1] | Pre-emphasis exists |

Subsequently, 4 bits of $Q_5$ to $Q_8$ are set as an address, which are control bits of the sub Q-data.

If the address is [0001], the sub Q-data of the subsequent $Q_9$ to $Q_{80}$ is audio Q-data. If the address is [0100], the sub Q-data of the subsequent $Q_9$ to $Q_{80}$ is video Q-data.

Then, $Q_9$ to $Q_{80}$ forms the sub Q data of 72 bits, and the remaining $Q_{81}$, to $Q_{96}$ form CRC.

In the lead-in area, the sub Q-data recorded therein forms TOC data.

Figure 10A:
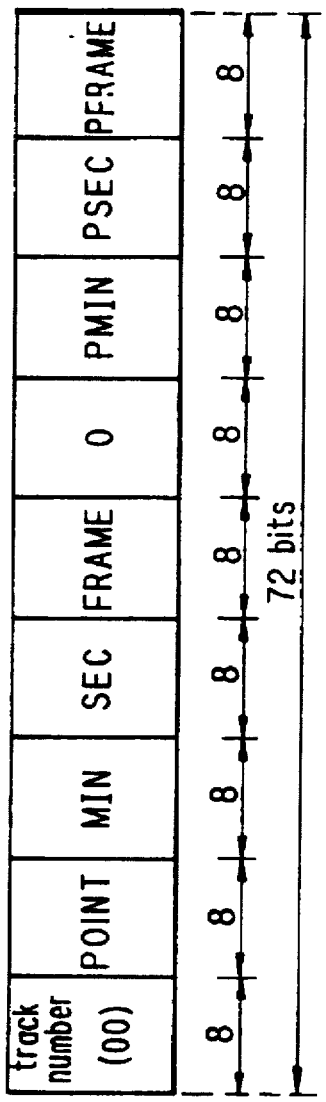
FIGS. 10A and 10B are explanatory diagrams showing sub-Q data.

In other words, the sub Q-data of 72 bits consisting of $Q_9$ to $Q_{80}$ in the Q-channel data read from the lead-in area has information shown in FIG. 10A. The sub Q-data is divided into 8 bit groups.

First, a track number is recorded in the lead-in area. The track number is fixed to [00] in the lead-in area.

Subsequently, POINT is written, and MIN (minute), SEC (second) and FRAME (frame number) are further indicated as the elapsed time within a track.

Moreover, PMIN, PSEC and PFRAME are recorded. The meanings of PMIN, PSEC and PFRAME are determined in accordance with the value of POINT.

When the value of POINT is [01] to [99], it means a track number. In this case, in PMIN, PSEC and PFRAME, the start point (absolute time address) of a track of that track number is recorded as minute (PMIN), second (PSEC) and frame number (PFRAME).

When the value of POINT is [A0], the track number of a first track is recorded in PMIN. Also, CD-DA, CD-I (CD-Interactive) and CD-ROM (XAtype) are discriminated by the value of PSEC.

When the value of POINT is [A1], the track number of a final track is recorded in PMIN.

When the value of POINT is [A2], the start point of the lead-out area is indicated as an absolute time address in PMIN, PSEC and PFRAME.

For example, in the case of a disc having 6 tracks on which data has been recorded, data is recorded as TOC data of such sub Q-data as shown in FIG. 11.

As shown in FIG. 11, all of the track numbers TNOs are [00].

The block NO. indicates the number of sub Q-data of one unit read as block data of 98 frames as described above.

In the respective TOC data, the same contents are written over three blocks.

As shown in FIG. 11, when POINT is [01] to [06], the start point of track #1 to track #6 is indicated as PMIN, PSEC and PFRAME.

When POINT is [A0], [01] is indicated as the first track number in PMIN. Also, the type of a disc is discriminated by the value of PSEC, and when the disc is CD-ROM (XA type), PSEC=[20] as shown in the figure. In the case of CD-DA, PSEC becomes [00], and in the case of CD-I, PSEC becomes [10].

The track number of the final track is recorded at a position where the value of POINT is [A1], and the start point of the lead-out area is indicated in PMIN, PSEC and PFRAME at a position where the value of POINT is [A2].

The contents of blocks n to n+26 are repeatedly recorded in block n+27 and the subsequent blocks.

Figure 10B:
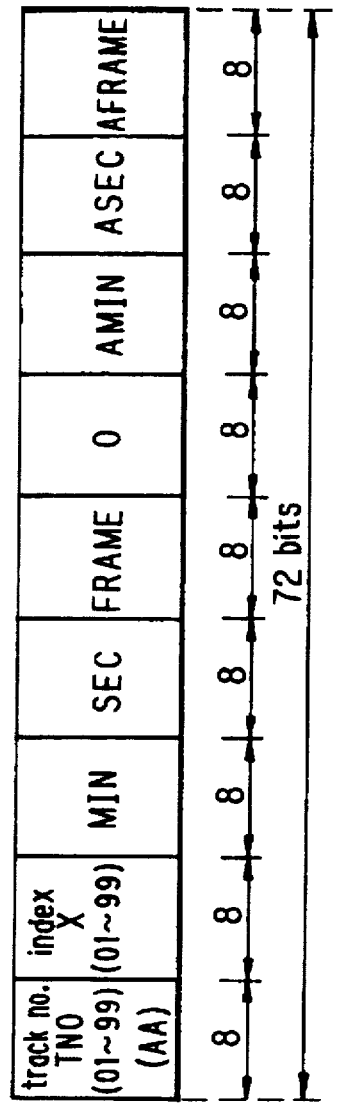

In the tracks #1 to #n and the lead-out area, the sub Q-data recorded therein has information shown in FIG. 10B.

First, a track number is recorded in the lead-out area. In other words, the respective tracks #1 to #n may have any track number of [01] to [99]. Also, the track number of the lead-out area is [AA].

Subsequently, information which allows the respective tracks to be further granulated is recorded as an index.

MIN (minute), SEC (second) and FRAME (frame number) are indicated as the elapsed time within a track.

Moreover, the absolute time address is recorded as minute (AMIN), second (ASEC) and frame number (AFRAME) in AMIN, ASEC and AFRAME.

6. Directory Structure

Figure 7:
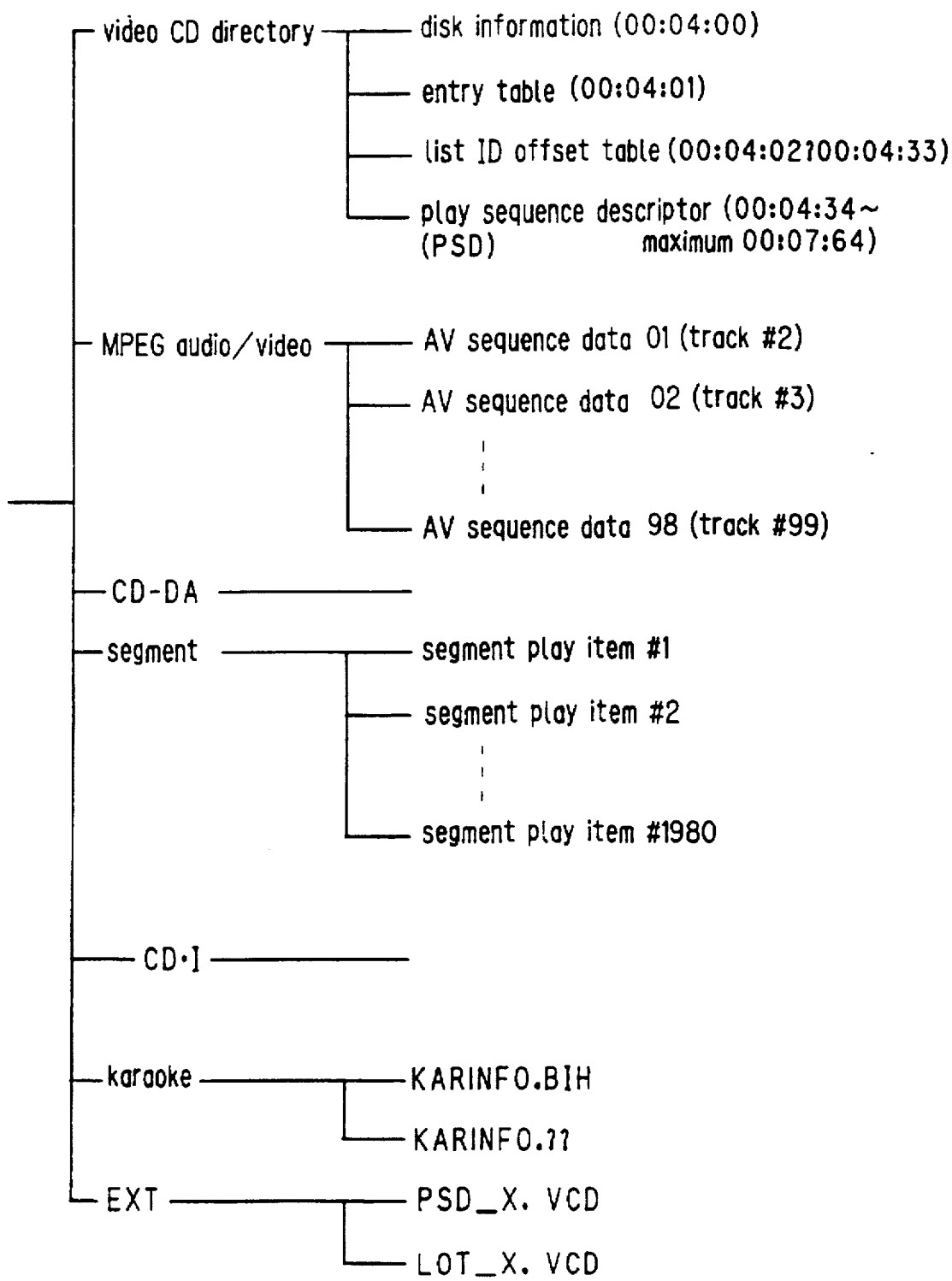
FIG. 7 is an explanatory diagram showing the directory structure of the video CD.

The directory structure of a video CD is shown in FIG. 7.

In the video CD shown in FIG. 6B, a video CD directory, an MPEG audio/video, CD-DA, segment, CD-I, Karaoke and EXT are required as the directory structure as shown in FIG. 7.

The video CD directory is recorded in the video CD information area within the track #1 shown in FIG. 6B and provided with disc information, an entry table, a list ID offset table, and a play sequence descriptor. They will be described later.

The MPEG audio/video is a sequence data of audio/video. That is, in the video CD having 99 tracks on which data can be recorded at the maximum, it is 98 sequence data consisting of track #2 to track #99 at the maximum.

The segment designates segment play items #1 to #1980 on which 1980 units can be recorded at the maximum, and recorded in a segment play item area within the track #1.

Further, the CD-I application program within the track #1 has a directory file which is assembled into a directory structure as CD-I. Also, in the case where a Karaoke basic information area is used, its directory file is assembled into the directory structure as Karaoke.

In the case where a track is provided on which only audio data has been recorded, its directory file is assembled into the directory structure as CD-DA. In the case where PSD X. VCD and LOT X. VCD are used, its directory file is assembled into the directory structure as EXT.

7. Control Data Track of Video CD

In the video CD, as described above, the track #1 is used as a control data track.

As described above with reference to FIGS. 6A and 6B, there are provided, in this area, PVD (basic volume descriptor), a Karaoke basic information area, a video CD information area, a segment play item area and other files (CD-I application program, etc.).

As shown in FIG. 6B, PVD is arranged from a position of the absolute time address 00:02:16 on the disc.

Also, the Karaoke basic information area is arranged from a position of the absolute time address 00:03:00.

The video CD information area is arranged from a position of the absolute time address 00:04:00.

Then, the segment play item area is arranged from a position indicated within the video CD information area, and the CD-I application program is arranged from a position indicated within PVD.

a. PVD (Basic Volume Descriptor)

The structure of the PVD (Basic Volume Descriptor) arranged from a position of the absolute time address 00:02:16 is shown in FIG. 12.

First, data of [CD001] is recorded as a volume structure standard ID. Subsequently, a system recognitor, a volume recognitor, the number of volumes of an album, and an album set sequence number are recorded. One album is constituted by a single disc or a plurality of discs. The volume number of the album is identical to the number of discs in one album. The number of discs in one album is an album set sequence number.

Subsequently, a logic block size, a pass table, the address of a pass table and a route directory record are recorded.

A disc title is recorded as an album recognitor, and subsequently the names of a publisher and an author are recorded.

Furthermore, the application name of CD-I is recorded as an application recognitor.

Thereafter, the name of a copyright file, the name of a summary file, the name of a catalog file, the date of manufacture, the date of correction, the date of expiration, the effective date, a file structure standard version number, and finally an XA label code are recorded.

b. Video CD Information

The video CD information is recorded from an absolute time address 00:04:00 on the disc.

Figure 13:
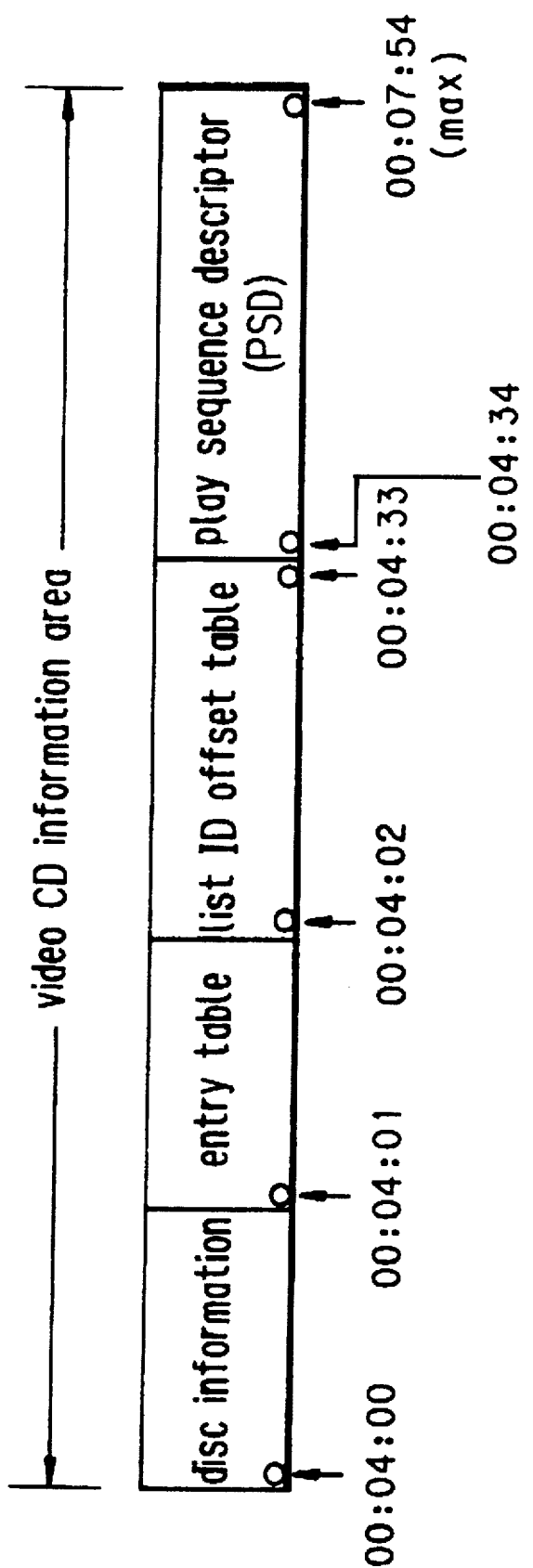
FIG. 13 is an explanatory diagram showing a video CD information area of the video CD.

The video CD information has disc information, an entry table, a list ID offset table and a play sequence descriptor (PSD) as video CD information, as shown in FIG. 13. They are the respective file structures in the video CD directory shown in FIG. 7.

The disc information is arranged from the absolute time address 00:04:00 which is a head position of video CD information.

The entry table is arranged from the absolute time address 00:04:01.

The list ID offset table is arranged from the absolute time address 00:04:02 to the absolute time address 00:04:33.

The play sequence descriptor (PSD) is arranged from the absolute time address 00:04:34, and reaches the absolute time address 00:07:64 at the maximum.

-b1- Disc Information

First, the disc information arranged from the absolute time address 00:04:00 will be described.

The area of disc information has a structure shown in FIG. 14.

First, the system recognitor of the video CD is recorded in the first to eighth bytes.

Subsequently, a version number is recorded with two bytes of the ninth to tenth bytes. In the case of the version 2.0, the version number is [$0200]. One album is constituted by a single disc or a plurality of discs. The volume number of the album is identical to the number of discs in one album. The number of disc in one album is an album set sequence number.

The size map of a moving picture track is recorded with 13 bytes of the 31st to 43rd bytes. This is data for discriminating whether data of the respective tracks #2 to #99 is an NTSC signal or a PAL signal. In other words, the first byte LSB of 13 bytes represents the track #2, data until the track #99 each having one bit is recorded from the data #2 to the bit 1 of the last byte. If a bit corresponding to each track is [0], it represents a NTSC signal. If the bit is [1], it represents a PAL signal.

A status flag is recorded with one byte at the 44th byte. In bit 0 to bit 7 of this byte, bit 0 is a flag of a Karaoke basic information.

If bit 0 is [0], no Karaoke basic information exists. If bit 0 is [1], it represents that Karaoke basic information is recorded from the sector of the absolute time address 00:03:00.

The byte size of PSD (play sequence descriptor) is represented with four bytes of the 45 to 48 bytes. As shown in FIG. 13, PSD is recorded from the absolute time address 00:04:34 to the absolute time address 00:07:64 at the maximum, and the byte size is changeable. Therefore, the byte size is represented by those bytes.

PSD which will be described later is constituted as a plurality of lists (a selection list, a play list and an end list) used for playback control, and the respective lists are recorded as PSD. When no PSD exists, that is, in the case of a disc having no playback control function, those 4 bytes are [0].

A first segment address is indicated at three bytes of the 49th to 51st bytes. As described above, the start point of the segment play item area is recorded in the video CD information area as shown in FIG. 6B. Those three bytes correspond to the video CD information area.

The segment play item will be described next. The segment play item of 1980 bytes at the maximum can be recorded in the segment play item area shown in FIG. 6B. Video data or audio data used for playback control or the like is recorded as the respective segment play items.

An offset multiplier is recorded in one byte of the 52nd byte. This is a multiplier used for calculating the address of the respective lists within PSD. In this case, it is fixed to [8].

The number of the list ID is represented by two bytes of the 53rd to 54th bytes. This represents the number of the effective list ID recorded in the list ID offset table which will be described later.

The number of the segment play items recorded in the segment play item area is designated in two bytes of the 55th to 56th bytes.

A segment play item content table is recorded in 1980 bytes of the 57th to 2036th bytes. It represents the attribute of the respective segment play items recorded in the segment play item area.

In other words, the 1980 segment play items #1 to #1980 can be recorded at the maximum. In the segment play item contents, the respective attribute data is recorded in association with the segment play items #1 to #1980 byte-by-byte as shown in FIG. 15.

For each bit (bit 0 to bit 7) of one byte, the attribute data is defined as stated below. The bit 6 and the bit 7 are undefined.

| Bit 1 and bit 0 | |
|---|---|
| [00] | No MPEG audio data |
| [01] | Monaural audio data |
| [10] | Stereo audio data |
| [11] | Dual channel audio data |

-continued

| | Bit 4 to bit 2 | |
|---|---|---|
| | [000] | No MPEG video data |
| | [001] | Standard level still picture data of NTSC size |
| | [010] | High-resolution level still picture data of NTSC size |
| | [011] | Moving picture data of NTSC size |
| | [100] | Unused |
| | [101] | Standard level still picture data of PAL size |
| | [110] | Standard and high-resolution level still picture data of PAL size |
| | [111] | Moving picture data of PAL size |
| | Bit 5 | |
| | [0] | Individual item or the head item of the continuous items |
| | [1] | Second item or subsequent items of the continuous items |

The 2037th to 2048th bytes of disc information subsequent to such segment play item contents are undefined.

-b2- Entry Table

As shown in FIG. 13, in the video CD information area, the entry table is arranged from the absolute time address 00:04:01.

In this entry table, a predetermined point within the audio/video sequence can make an entry as a start point.

Therefore, an ID representative of an entry file, a version number, the number of entries and so no are recorded in the entry table, and the entries of 500 at the maximum can be recorded as actual entry points. In other words, entry #0 to entry #499 can be set.

One entry is constituted by 4 bytes, one of which represents a track number, and the remaining three bytes of which represent sector addresses, that is, ASEC, AMIN and AFRAME.

-b3- List ID Offset Table

A list ID offset table is arranged in a sector existing between the absolute time addresses 00:04:02 and 00:04:33 in the video CD information area.

The play list and selection list recorded in PSD which will be described later inherently have list IDs, respectively. An offset amount representative of the position of each list in PSD is represented in the list ID offset table. When the user designates a desired list that the user wishes to replay, the apparatus for replaying the video CD obtains the position of the designated list within PSD and can execute the list contents by referring to the list ID offset table.

The list ID offset table is constituted by 32 sectors at the maximum as shown in FIG. 16, and each offset amount is represented by two bytes so that the offset of 64K is represented.

The area of PSD which will be described later is located between the absolute time address 00:04:34 and the absolute time address 00:07:64 at the maximum, that is, it becomes 3 seconds 31 frames. This corresponds to 256 sectors which are 512 Kbytes.

The number obtained by multiplying the offset of 64K represented in the list ID offset table by 8 is 512 Kbytes. [8] is an offset multiplier of the 52nd byte of the disc information shown in FIG. 14.

In other words, the offset is a numerical value which represents a predetermined position in the PSD area as a byte position from the head position (the position of an offset [0000]) of the PSD by multiplying the offset position by the offset multiplier [8] because one offset corresponds to 8 bytes.

First, the start-up offset is recorded. This is fixed to a value of [$0000]. The example shown in FIG. 16 is a case where the number of the list IDs is 6, and the respective lists ID1 to ID6 have offset values. In the list ID1 arranged at the head of PSD, the offset value is always fixed to a value of [$0000]. Also, in the unused list ID, the offset value is set to [$FFFF].

-b4- PSD (Play Sequence Descriptor)

PSD is provided from the absolute time address 00:04:34. The play list, the selection list and the end list are recorded in PSD. Those lists are used for playback control which will be described later, in which data representative of the replay contents and the hierarchy branch is recorded. The play list includes no data (selection menu) for branching to a lower hierarchy therein, but designates a sequence of contents to be replayed. The selection list includes data (selection menu) for branching to the lower hierarchy. A list (play list or selection list) to be replayed first is set to the list ID1 and recorded at the head position (offset position) of PSD.

* Play List

The play list which designates a sequence of contents to be replayed is constituted as shown in FIG. 17.

A play list header is first provided and indicated by (10h].

Subsequently, the number of play items recorded in the play list is indicated as the number of items. The play item is representative of the contents to be replayed, in which data for designating play items is recorded, as the play item #1 to #N.

Subsequent to the number of items, the list ID of 2 bytes which is inherent to each list is recorded.

Then, the previous list offset, the next list offset and the return list offset, each consisting of 2 bytes, are recorded.

The previous list offset represents the position (offset) of a list which is to be advanced when the previous operation has been conducted. For example, in the case where a list is upgraded, if the position of a list having one higher level is designated by the previous list offset, a user can return to the position of the operating state in the previous list by the previous operation. When the previous list offset is [$FFFF], the previous operation is prohibited.

The next list offset represents the position of a list to be sequentially advanced when the replay operation designated by the play list is ended or the next operation is conducted. The next list offset is prohibited from being set to [$FFFF].

The return list offset represents the position of a list to be advanced when the return operation has been conducted. For example, in the case where the list is to be graded, if the position of a list of the highest level is designated by the return list offset, the user can return to the position of the operating state in the list of the highest level by the return operation.

Thereafter, a playing time of 2 bytes, a play item wait time of 1 byte and an automatic pause wait time of 1 byte are recorded. The playing time represents the number of sectors in the replay operation based on the play list. The play item wait time represents a wait time when the replaying of the respective play items is ended. The wait time 0 to 2000 seconds are indicated by [$00] to [$FE]. In the case of [$FF], the operation of the user is expected. The automatic pause wait time represents a wait time in the automatic pause operation.

Finally, Nos. of the play items #1 to #N to be replayed are represented by 2 bytes, respectively. The play item number (PIN) is defined as shown in FIG. 18.

When PIN=[0] or [1], no replay is conducted in its play item. When PIN=[2] to [99], the PIN represents a track No. For example, if PIN=5, the play item becomes a play item for replaying the track #5.

If PIN=[100] to [599], the value of (PIN-100) thereof represents an entry in the entry table. As described above, the entry points of 500 at the maximum can be represented as entries #0 to #499 in the entry table, and any entry number of #1 to #500 is designated as a value of (PIN-100).

When PIN=[1000) to [2979], the value of (PIN-999) represents No. of the segment play item. In the segment play item area, the segment play items of 1980 at the maximum can be recorded as the segment play items #1 to #1980. Any segment play item of #1 to #1980 is designated as a value of (PIN-999).

PIN=[600] to [999] and PIN=[2980] to [$FFFF] are undefined.

For example, it is assumed that 3 play items are recorded in the play list, the play item #1 is [04], the play item #2 is [1001] and the play item #3 is [102]. Then, in the replay operation executed by the play list, the track #4 is first replayed, the segment play item #2 is subsequently replayed, and the replay from the entry point of the entry #3 is finally conducted.

* Selection List

The selection list allows the user to select the operation to be advanced by replaying the selection menu, and structured as shown in FIG. 19.

First, a selection list header of one byte is provided, and the selection list is indicated by the selection list header of [18h].

Subsequently, the number of selection elements in the selection list is recorded in the unused one byte area. The number of selection elements is 99 at the maximum.

Then, the first No. of the selection elements is indicated. This is usually [1], but in the case where a plurality of selection lists are used because No. of selection elements to be selected is large, in the second and following selection lists, the first No. of the selection element is the first selection element No. in the lists. Thereafter, a list ID inherent in each list is recorded in two bytes.

Subsequently, as in the play list, a previous list offset, a next list offset and a return list offset, each consisting of 2 bytes are recorded. In other words, the previous list offset represents the position (offset) of a list to be advanced when the previous operation has been conducted. Also, when the previous list offset is [$FFFF], the previous operation is prohibited.

Also, the next list offset represents the position of a selection list to be sequentially advanced when the next operation has been conducted. In the case where no list to be sequentially advanced exists, the next list offset is set to [$FFFF].

Furthermore, the return list offset represents the position of a list to be advanced when the return operation has been conducted. For example, in the case where one selection is made in a plurality of selection lists, the foregoing offsets are effectively used. For example, if 12 selection elements are set, and 4 selection elements are set in each of 3 selection lists, the respective selection lists are made continuous in series by the previous list offset and the next list offset. As a result, the user can retrieve a desired selection element through the previous operation/next operation.

Further, a default list offset is recorded. This represents the position of a list to be advanced when the execution operation is conducted without the selection made by the user.

Also, the time-out list offset is recorded. This represents the position of a list to be advanced when a predetermined time elapsed without giving an input to the replayed selection menu by the user.

Subsequently, a wait time until timeout is recorded. After the wait time elapses with no input being given by the user, the operation proceeds to the foregoing timeout list offset.

Thereafter, a loop count and a jump timing are indicated. The loop count represents the number of times of repeatedly replaying the play item in this list. The jump timing represents a timing at which the operation proceeds to the next list after the selection operation has been made.

Subsequently, a play item number (PIN) is provided. PIN represents the play item to be replayed in the execution state of the selection list as shown in FIG. 18 which was described above. What is replayed by the selection list is a normal menu screen. For that reason, menu video data is recorded as the segment play item, and there are many cases in which a specified segment play item is designated in the respective selection lists.

For example, in the case where the menu image data corresponding to the selection list is recorded as the segment play item #4, the play item No. is [0003]. In this way, the selection list is provided with one PIN.

Finally, a selection #BSN offset to a selection # (BSN+ NOS-1) offset are represented by 2 bytes, respectively, in order to actually represent the operation to be executed by the selection within the selection elements. BSN is the first number of the selection element to be recorded at the fourth byte of the selection list, and NOS is the number of selection elements recorded at the third byte of the selection list. Therefore, in the selection list having the selection elements 1 to 4, the selection #1 offset to the selection #4 offset are recorded.

The respective selection offsets represent the position of a list (selection list or play list) to be advanced in the case where the selection element 2 is selected by the user. For example, when the user selected the selection element 2 with respect to the menu display, the selection offset of this type designates to proceed to a list shown in the selection #2 offset.

* End List

An end list represents the end of application. The structure of the end list is 8 bytes where one byte is an end list header and 7 bytes are [$00].

c. Segment Play Item

The video CD data track shown in FIG. 6B is provided with a segment play item area. The start point of the segment play item area is indicated by 3 bytes of the 49th to 51st bytes of the disc information shown in FIG. 14.

The segment play items of 1980 at the maximum can be recorded in the segment play item area. The respective segment play items can be freely produced by still picture data, moving picture data, audio data and so on, respectively.

One segment is constituted by 150 sectors. The respective segment play items may be data to be replayed as an independent item, or a plurality of items which are sequentially replayed.

The respective play items, as was described with reference to FIG. 15, have data attributes represented by the segment play item contents of 57th to 2036th bytes in the disc information. The menu screen of the selection list and so on can be prepared, as described above, by the use of the segment play item.

II. Playback Control (PBC)

1. List Structure

As described above, the play list and the selection list can provide a so-called playback control (PBC) in the video CD. This is a function of realizing the video CD as a simple interactive software which combines a moving picture, a still picture and audio together.

In other words, still picture data forming several menu screens as the segment play items is prepared in the segment play item area, and a several branch replay is enabled by the selection list. The play item selected by the branch is replayed in accordance with the play list. In other words, a description file, which is graded in accordance with the selection list and the play list, is formed, and the operation proceeds to the lower level in accordance with the selection by the user, thereby executing a necessary replay operation.

As a basic list structure, a selection list is arranged at the highest level, and several play lists are arranged as the selection elements of the selection list. For example, as the selection #1 offset to the selection #3 offset of the foregoing selection list, specified play lists are designated, respectively. Then, the menu display is executed in the selection list so that the user can select the menu.

For example, if the user selects the selection #3, the operation proceeds to the play list indicated in the selection #3 offset, thereby replaying data indicated as the play items #1 to #N. For example, if a track #5 is designated as one play item #1 in the advanced play list, the replay of the track 5 is executed.

2. Example

An example of the operation of the foregoing playback control (PBC) will be described with reference to FIGS. 20 and 21. This example is a case where data of an English conversion lesson is recorded on the video CD.

Figure 20:
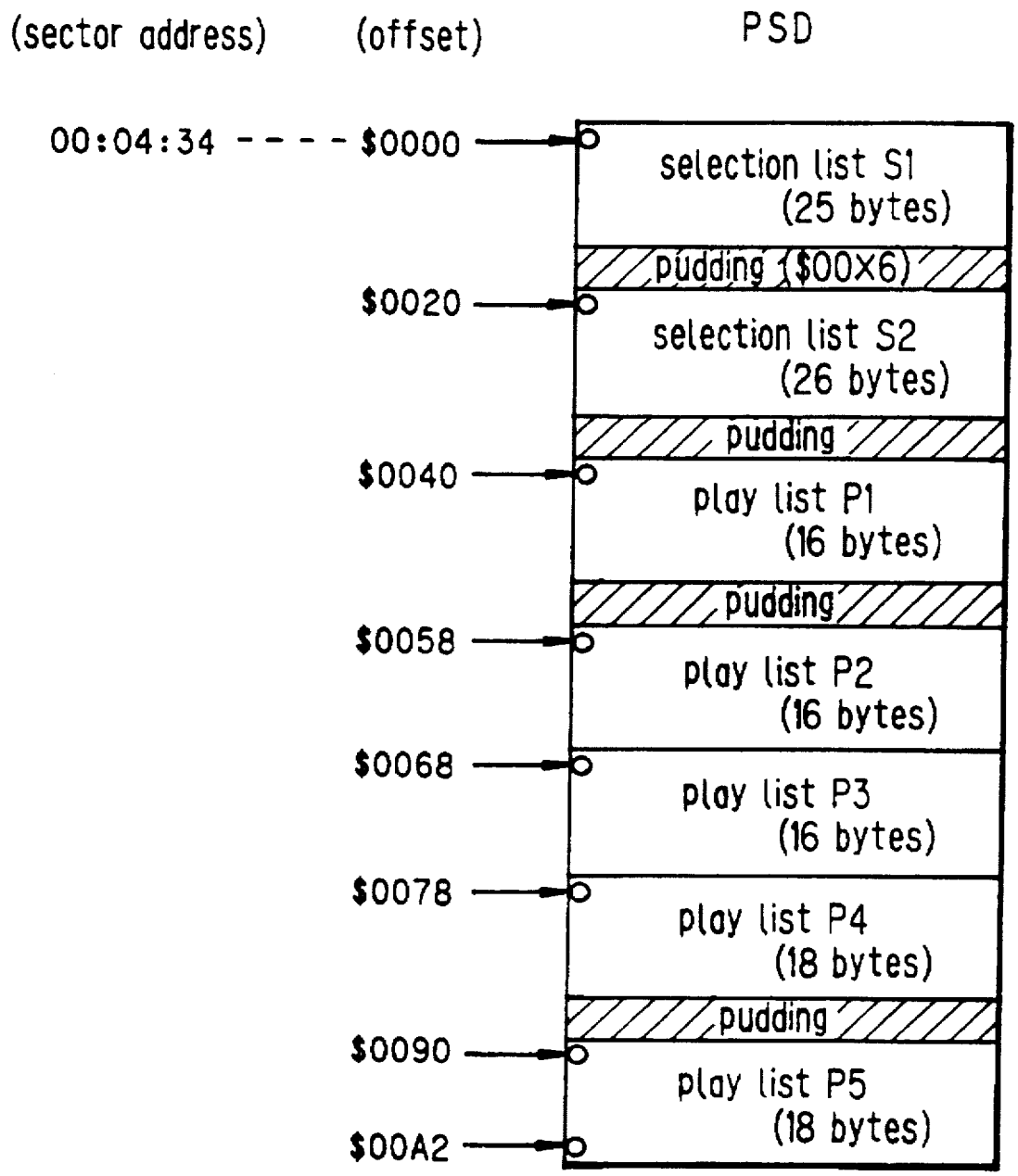
FIG. 20 is an explanatory diagram showing the list structure of the video CD.

Now, it is assumed that a list shown in FIG. 20 is recorded as PSD from the position of the absolute time address 00:04:34 within the video CD information area. In other words, it is assumed that selection lists S1, S2 and play lists P1 to P5 are recorded.

Figure 21:
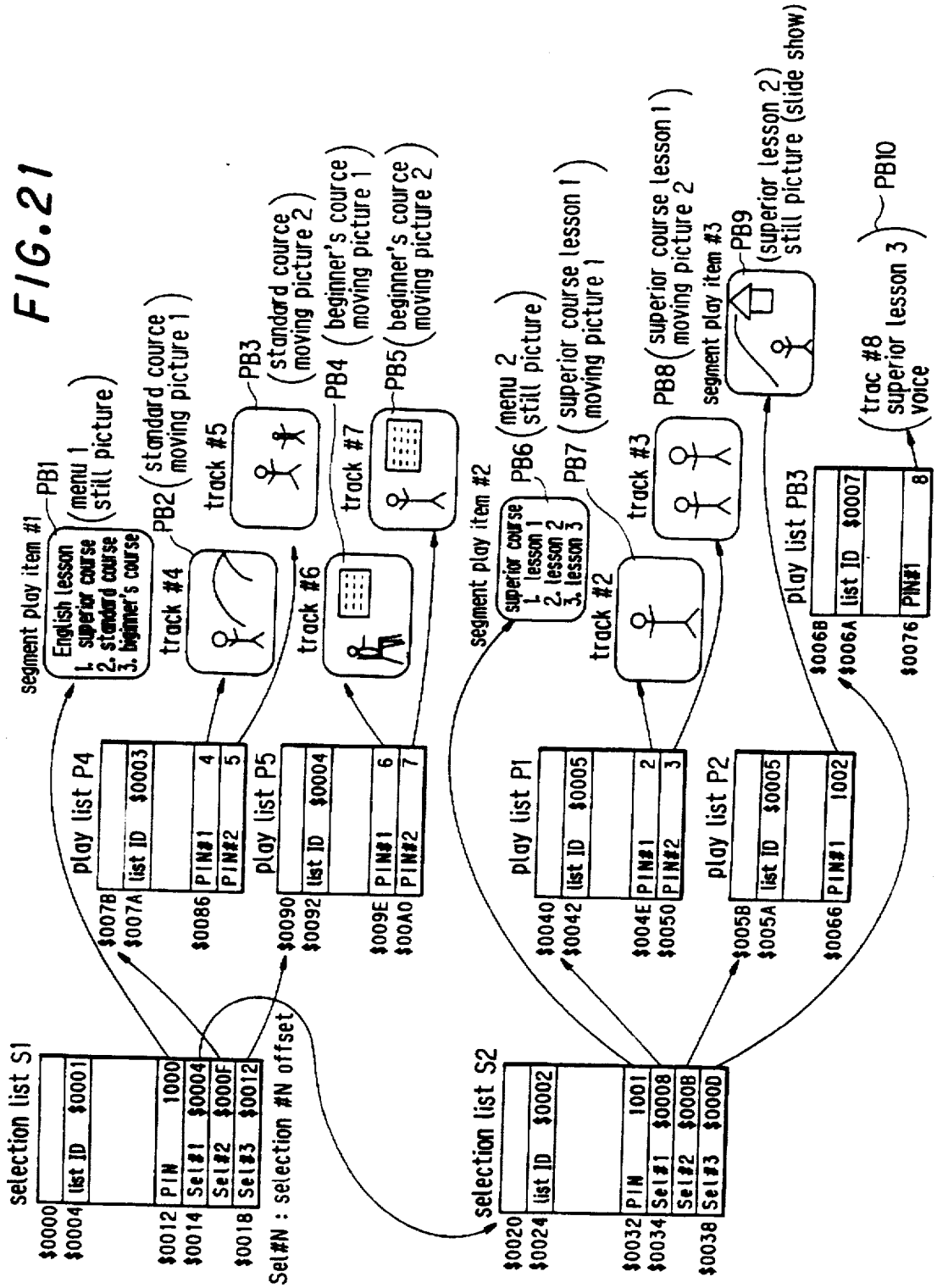
FIG. 21 is an explanatory diagram showing the playback control operation in accordance with the list structure of the video CD.

In each of the lists, a list ID is attached thereto as shown in FIG. 21. In other words, the list ID is set so that the selection list S1 is $0001, the selection list S2 is $0002, the play list P1 is $0005, the play list P2 is $0006, the play list P3 is $0007, the play list P4 is $0003 and the play list P5 is $0004.

After the playback control operation is started, the selection list S1, where the list ID is $0001, first functions. As the operation for the selection list S1, the replay for the play item No. (PIN) recorded therein is first conducted. A value of [1000] is indicated in the PIN. Because [1000] in the PIN is a numerical value indicating a segment play item #1 as understood from FIG. 18, the segment play item #1 recorded in the segment play item area is replayed.

The replay output of the segment play item #1 is a still picture menu screen for selecting the course of an English lesson as indicated by PB1. A selection #1 offset to a selection #3 offset which correspond to three selection elements are recorded in the selection list S1. Accordingly, three selection elements are displayed due to the replay output video for the segment play item #1. [Sel#N] in the figure indicates the selection #N offset.

The user inputs a desired selection element No. to the video PB1. If the selection element No. 1 is inputted, the operation proceeds to a list indicated by the selection #1 offset. The selection #1 offset is [$0004], and therefore [$0020] is obtained by multiplying that numerical value by an offset multiplier [8]. This is an offset byte of the selection list S2 within PSD.

A value [1001] is indicated in PIN of the selection list S2. In other words, this indicates the segment play item #2. As a result, the segment play item #2 is replayed. The replay output PB6 of the segment play item #2 becomes a still picture menu screen for selecting lesson courses 1 to 3 in the superior course of the English lesson.

On the other hand, if the user inputs the selection element No. 1, the operation then proceeds to a list indicated by the selection #1 offset in the selection list S2. The selection #1 offset is [$00008], and therefore [$0040] is obtained by multiplying that numerical value by the offset multiplier [8]. In other words, the operation proceeds to a play list P1.

In the play list P1, the value of PIN#1 is [2] and a track #2 is designated. A value of PIN#2 is [3] and a track #3 is designated. For that reason, when the operation proceeds to the play list P1, the track #2 is replayed and a moving picture (and audio) PB7 is outputted. This results in the moving picture and audio of the superior course lesson 1. After the replay of the track #2 has been completed, the track #3 is subsequently replayed so that a moving picture (and audio) PB8 is outputted.

If the user inputs the selection element No. 2 while a menu video PB6 is outputted through the selection list S2, the operation proceeds to a list indicated by the selection #2 offset in the selection list S2, that is, the play list P2.

In the play list P2, the value of PIN#1 is [1002] and the segment play item #3 is designated. For that reason, when the operation proceeds to the play list P2, the segment play item #3 is replayed, and a still picture (and audio) PB9 is outputted. For example, a superior course lesson 2 is a case in which a lesson is based on a slide show.

If the user inputs the selection element No. 3 while the menu video PB6 is outputted through the selection list S2, the operation proceeds to a list indicated by the selection #3 offset in the selection list S2, that is, the play list P3.

In the play list P3, a value of PIN#1 is [8] and a track #8 is designated. It is assumed that the track #8 is a track for only digital audio data. Then, the track #8 is replayed as the superior course lesson 3 so that an output PB10 for only audio is conducted.

Subsequently, if the user inputs a selection element No. 2 which is a medium course while the menu video PB1 is outputted through the first selection list S1, the operation then proceeds to a list indicated by the selection #2 offset in the selection list S1, that is, the play list P4.

In the play list P4, PIN#1=[4] and a track #4 are designated. Also, PIN#2=[51] and a track #3 are designated. Accordingly, upon proceeding to a play list P4, the track #4 is first replayed so that the moving picture (and audio) PB2 is outputted. Subsequently, the track #5 is replayed so that the moving picture (and audio) PB3 is outputted. This results in the moving picture and audio of the medium course.

Also, if the user inputs a selection element No. 3 which is a beginner course while the menu video PB1 is outputted through the first selection list S1, the operation then proceeds to a list indicated by the selection #3 offset in the selection list S1, that is, the play list P5.

In the play list P5, a track #6 is designated with PIN#1=[6]. Also, a track #7 is designated with PIN#2=[7]. Accordingly, upon proceeding to a play list P5, the track #6 is first replayed so that the moving picture (and audio) PB4 is outputted. Subsequently, the track #7 is replayed so that the moving picture (and audio) PB5 is outputted. This results in the moving picture and audio of the beginner course.

As described above, the previous list offset, the next list offset and the return list offset can be recorded in the play list and the selection list. Also, the default list offset and the timeout list offset can be recorded additionally in the selection list. As a result, the progress, the regress and so on of the list can be executed in accordance with an operation, etc.

For example, if [$0004] has been recorded as the previous list offset of the play list P1, the operation returns to the selection list S2 where the offset is [$0004],that is, offset bytes [$0020] by executing the previous operation by the user during the action of the play list P1.

As described in the foregoing example, the video CD can include a simple interactive software through playback control. With such a function, the video CD can cope with not only music or movie but also various other activities such as education, game or electronic publication.

[III. Structure of Replay Apparatus]

1. Appearance

Subsequently, a description will be given of a replay apparatus which is capable of replaying the foregoing video CD in accordance with one embodiment of the present invention.

The replay apparatus of this embodiment includes a disc exchangeable function which is capable of accommodating 5 video CDs and/or CD-DAs to selectively replay them.

Figure 22:
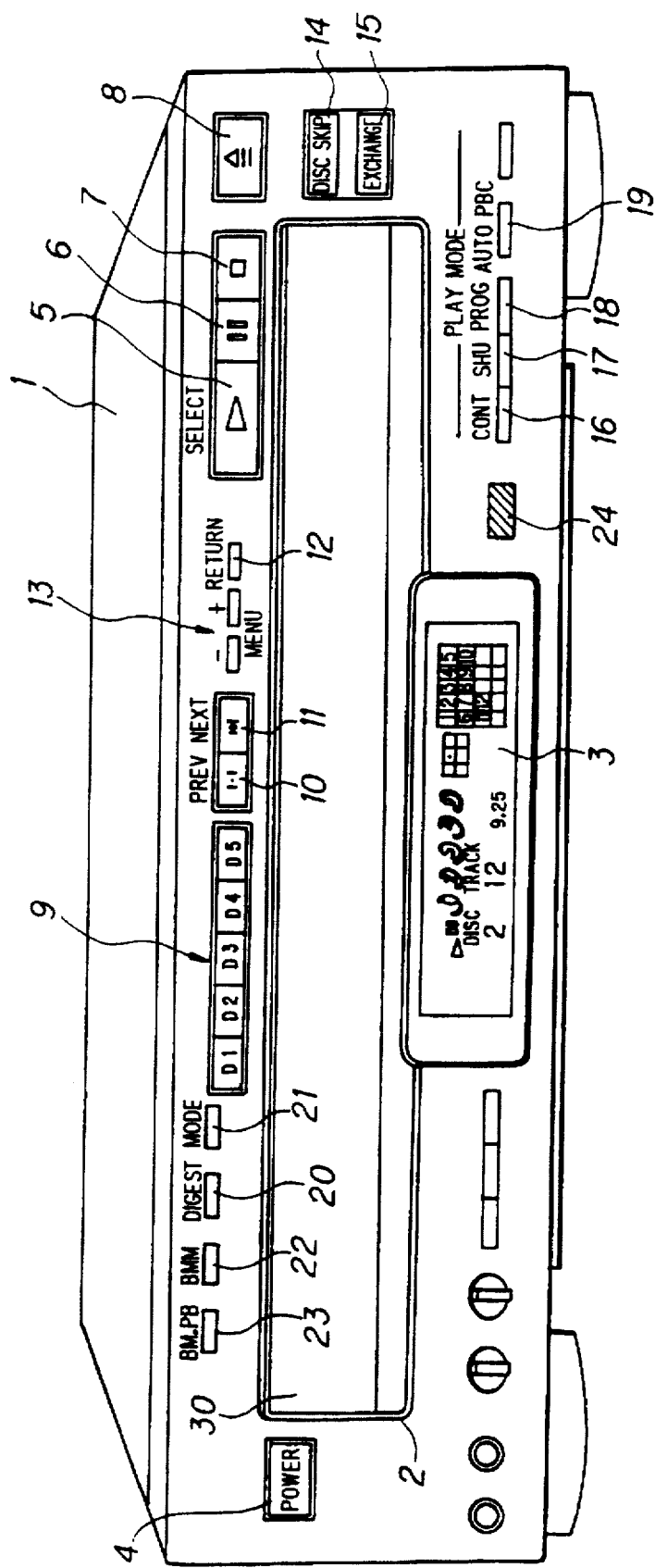
FIG. 22 is a diagram showing a physical appearance of a replay apparatus in accordance with the present invention.

FIG. 22 shows a diagram of an appearance of the replay apparatus. The replay apparatus includes a front panel of a replay apparatus body 1, which defines an opening 2 therein. The opening 2 is covered by the front portion of a disc tray 30. A circular rotary table 30a having a plurality of receivers for accommodating a plurality of discs mounted thereon is rotatably disposed in the disc tray 30. In this embodiment, the plurality of receivers formed in the rotary table 30a are radially arranged on one surface of the rotary table 30a with respect to the center of the rotary table 30a so that 5 discs can be accommodated in and mounted on the rotary table 30a. The plurality of receivers are formed as circular recesses slightly larger than the outer diameter of the disc. The bottom surface of the respective receivers has an opening which allows a light beam from an optical head, which will be described later, to be irradiated on the disc therethrough. The rotary table 30a is rotated by a drive mechanism not shown. As a result, a disc accommodated in one of the plurality of receivers selectively faces the optical head. The disc tray 30 is moved between an eject position which projects from the opening 2 and a position at which the opening 2 is closed, as shown in FIG. 22. One of the plurality of receivers of the rotary table 30a in the disc tray 30 is located opposite the optical head in a state shown in FIG. 22 (as to a mechanism, including the structure of the disc tray in the replay apparatus, refer to, for example, U.S. Pat. No. 5,123,005).

In FIG. 22, reference numeral 3 denotes a display unit including a liquid-crystal panel, on which information relating to the operating state of the replay apparatus, modes, No. of a selected disc, a performance time and so on is displayed.

On the front panel, a variety of keys manipulated by the user is provided such as a power on/off key 4, selection keys (selection enter key) manipulated when conducting the foregoing playback control operation, a replay key 5, a temporary stop key 6, a stop key 7 and an ejection key 8 used for conducting the eject operation of the disc tray 30.

The disc selection key 9 includes five keys [D1] to [D5] which correspond to five discs mounted on the rotary table 300 of the disc tray 30. For example, when the key [D1] is depressed, the disc situated in a first receiver on the disc tray is loaded into a position opposite the optical head, which will be described later, and then replayed.

A key 10 is a head position key (backward head position key) conducting the positioning operation in the direction of a smaller track No., and a key 11 is a head positioning key (forward head search key) conducting the positioning operation in the direction of a larger track No. The backward head positioning key 10 also acts as a previous function key and used for the previous operation when conducting the foregoing playback control operation. A return key 12 is used for the return operation when conducting the playback control operation.

A ± selection key 13 is used for the selection operation on the menu screen when conducting the playback control operation. In other words, the selection element No. is selected through the ± selection key 13 with respect to the menu screen, and when a certain selection element No. is designated, the selection operation is conducted through the replay key 5, whereby the selection for the menu is completed.

Reference numeral 14 denotes a disc skip key, and reference numeral 15 denotes a disc change key. Reference numerals 16 to 19 denote play mode selection keys. When a disc to which a playback control function is added is to be replayed, the operation is automatically changed over to the playback control operation by depressing the normal replay mode key 16. Reference numeral 17 denotes a random replay mode key, and reference numeral 18 denotes a program replay mode key. A PBC off key 19 allows a PBC mode to be turned off. In other words, in the case where a disc with the playback control function is loaded in the apparatus, when the PBC off key 19 is depressed, the menu replay operation in the PBC mode is changed to the normal sequential replay operation.

A digest key 20 is manipulated to allow the digest video for the respective accommodated discs to be displayed. A digest mode key 21 is manipulated so as to selectively change the digest video for the disc having the playback control function to a menu image or a video within a track.

If the user depresses a book mark register key 22 during the replay operation, data relating to an address of the replay point is registered in a memory. Thereafter, with the depression of the book mark replay key 23, that data is read out from the memory, and information can be replayed from the registered point. For example, five replay points for one disc are designated and registered through the book mark register key 22.

When one of the registered book mark points is selected after the depression of the book mark replay key 23, replay is started from its replay point. For example, the ± selection key 13 and the replay key 5 functioning as the selection key are used for the selection of the registered book mark points.

Reference numeral 24 denotes an infrared ray receiving unit. When a command signal is transmitted in the form of infrared rays from a remote commander (not shown), it is received by the infrared ray receiving unit 24 and converted into an electric signal. Then, the electric signal is supplied to a system controller which will be described later as operation information, thereby performing the change-over control for the operating state of the apparatus.

2. Circuit Block

Figure 23:
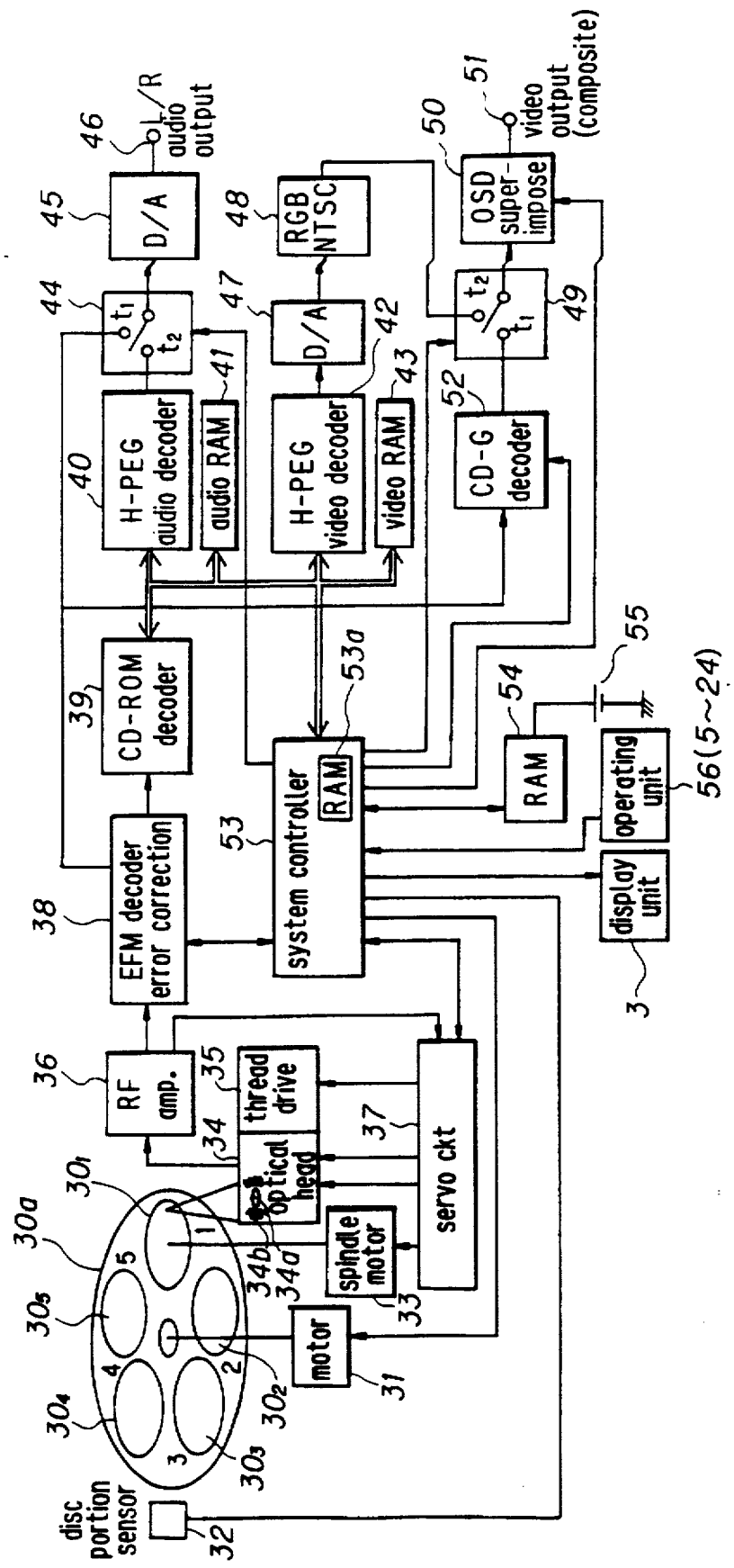
FIG. 23 is a block diagram showing the replay apparatus in accordance with one embodiment of the present invention.

FIG. 23 shows a block diagram of a replay apparatus.

In FIG. 23, as described above, the rotary table 30a of the disc tray 30 is provided with receivers 301, 302, 303, 304 and 305 on which five discs are mounted. The rotary table 30a of the disc tray 30 is arranged to be rotated by a motor 31. With the rotating operation of the rotary table 30a, a certain single Receiver $30_x$ (x=1, 2, 3, 4, 5) is transported to a position opposite the optical head 34. In other words, a disc mounted on that receiver $30_x$ is loaded at a position opposite the optical head 34. Reference numeral 32 denotes a disc position sensor. With an output of the disc position sensor 32, a system controller 53 consisting of a microcomputer can determine the present loading state, that is, which receiver $30_x$, is located at the position of the optical head 34.

The disc moved to the position opposite the optical head 34 is rotated by a spindle motor 33 and then chucked by a disc table fixed to a tip of the rotary shaft of the spindle motor 33 and a chucking plate, not shown. Then, while the disc is being rotated by the spindle motor 33 keeping its linear velocity constant, a light beam is irradiated onto the disc by the optical head 34, and information is read from its reflected light.

The optical head 34 includes a laser diode as a light source, an optical system consisting of a polarization beam splitter, an objective lens, and a photodetector for detecting a reflected light. The objective lens 34a is displaceably held by the actuator 34b in a radial direction of the disc, that is, a tracking direction and in a direction along which the objective lens 34a is in or out of contact with the disc, that is, in a focussing direction. Reference numeral 35 denotes a feed mechanism for moving the optical head 34 in the radial direction of the disc.

During the replay operation, an output signal from the photodetector of the optical head 34 is supplied to an RF amplifier 36. The RF amplifier 36 subjects the supplied output signal to an arithmetic processing to produce an RF signal, a tracking error signal, a focussing error signal and so on. Then, the produced RF signal is supplied to a decoder 38 to be subjected to EFM demodulation as well as error correction. Also, p- and q- channel sub-code data is extracted from the decoder 38 and supplied to the system controller 53.

The tracking error signal and the focussing error signal are supplied to a servo circuit 37. The servo circuit 37 generates a variety of servo drive signals in accordance with the supplied tracking error signal and focussing error signal as well as a track jump command and seeking command from the system controller 53, the rotational speed detection information of the spindle motor 33, and so on. The various servo drive signals thus generated are supplied to the actuator 34b and the feed mechanism 35 to execute the focussing and tracking control. Also, the servo drive signals allow the spindle motor 33 to be controlled for maintaining a constant linear velocity (CLV).

Reference numeral 39 denotes a CD-ROM decoder. The CDROM decoder 39, in the case where a disc which is replayed falls under the category of CD-ROM such as a video CD, executes a decoding processing in accordance with a CD-ROM format. The various disc information, such as information for the foregoing playback control, relating to the signals decoded by the CD-ROM decoder 39, is stored in the RAM 53a of the system controller 53.

The audio data decoded by the CD-ROM decoder 39 is supplied to an MPEG audio decoder 40. The MPEG audio decoder 40 decodes the audio data thus supplied and outputs a decoded audio signal at a predetermined timing, using an audio RAM 41.

Furthermore, the video data decoded by the CD-ROM decoder 39 is supplied to an MPEG video decoder 42. The MPEG video decoder 42 decodes the video data thus supplied and outputs a decoded video signal (RGB output) at a predetermined timing, using a video RAM 43.

A switch 44 is changed over in accordance with the kind of a disc to be replayed. In the case where a disc which is being replayed is CD-DA, a replay signal is subjected to a decoding processing such as an EFM modulation and CIRC by the decoder 38, thereby obtaining a digital audio signal.

During the replay operation of CD-DA, the switch 44 is connected to a terminal $t_1$, in accordance with a control signal from the system controller 53. Therefore, the digital audio signal from the decoder 38 is converted into an analog audio signal through a D/A converter 45 and then outputted from an audio output terminal 46 to an external equipment such as an amplifier circuit or amplifier disposed at a post-stage.

In the case where a disc which is being replayed is a video CD, the, audio data is obtained from the MPEG audio decoder 40. During the replay operation of the video CD, the switch 44 is connected to a terminal $t_2$ in accordance with the control signal from the system controller 53. Therefore, the digital audio signal from the MPEG audio decoder 40 is converted into an analog audio signal through a D/A converter 45 and then outputted from an audio output terminal 46 to an external equipment such as an amplifier circuit or amplifier disposed at a post-stage.

In replaying the video CD, an RGB video data is obtained as an output signal of the MPEG video decoder 42. The RGB video data is converted into an RGB analog signal through a D/A converter 47. The RGB analog signal from the D/A converter 47 is supplied to an RGB/NTSC encoder 48, whereby the RGB signal is converted into a composite video signal of the NTSC system. The composite video signal is supplied to the terminal $t_2$ Of the switch 49.

During the replay operation of the video CD, the system controller 53 connects the switch 49 to the terminal $t_2$. Consequently, the composite video signal of the NTSC system is supplied from the video output terminal 51 to a monitor device or the like through the OSD processor 50. A predetermined display can be superimposed on the output video in accordance with the operation of the OSD processor 50 based on an instruction from the system controller 53.

In the meantime, in a case where a disc to be replayed is CD-DA and also CD-G, still image data is read out from R to W channels of the sub-code. The still image data is supplied to a CD-G decoder 52 to be decoded, and outputted as a composite video signal (still picture) of the NTSC system. During the replay operation of CD-DA, the switch 49 is connected to the terminal $t_1$, and the video signal obtained from CD-G is supplied from the video output terminal 51 to the monitor device or the like through the OSD processor 50, thereby executing a video output. Similarly, in this case, a predetermined display can be superimposed on the output video.

A memory 54 includes a RAM, and the backup power of memory data is provided by a backup power supply 55. Stored in the memory 54 is data which must not vanish when power is off, such as the register data of the foregoing book mark point. An EEPROM or the like may be used for the memory 54.

Reference numeral 56 denotes an operation input section which is manipulated by the user. A variety of operation keys 5 to 23 shown in FIG. 22, an infrared ray receiving unit 24 and a mode commander (not shown) correspond to the operation input section 56.

When the replay operation of the disc is conducted, management information recorded on the disc, that is, TOC data and sub-code data are read out and then supplied to the system controller 53. The system controller 53 makes the display unit 3 display a replay time, etc. accordance with the management information.

[IV. All Disc Digest Operation]

1. First Example of Operation Processing

In the reply apparatus having the changer mechanism in which a plurality of discs can be loaded as described above, if the replay apparatus is so designed that the user can simply know which disc has been loaded in each of the receiving positions 301 to 305, its operation would be improved.

In view of this, according to one embodiment, a function which is called all disc digest display is added to the replay apparatus so that the contents of each of the loaded discs can be discriminated by taking a look at the contents using the all disc digest display.

A first example of the all disc digest display operation will be described below.

Figure 24:
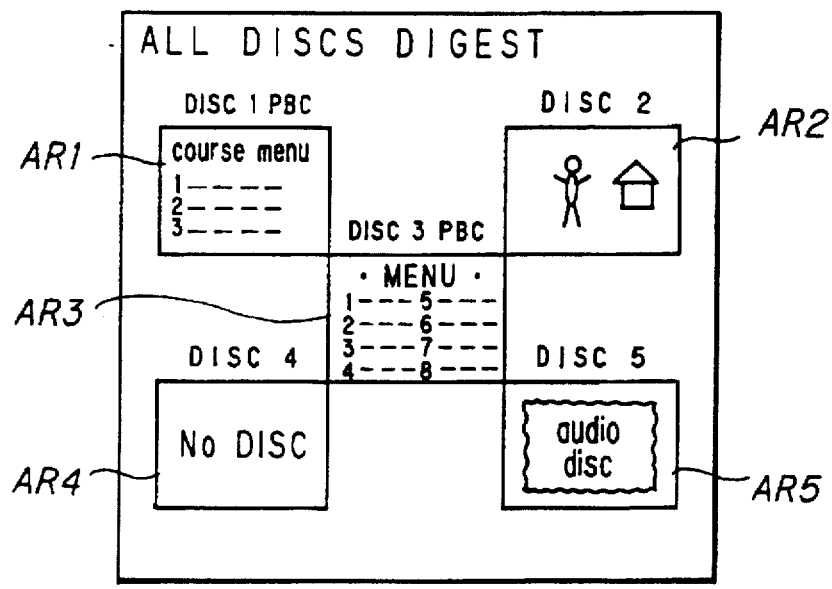
FIG. 24 is an explanatory diagram showing an all disc digest display in accordance with one embodiment of the present invention.

In the all disc digest display, for example, as shown in FIG. 24, the discs loaded at the receiving positions 301 to 305 are set as [DISC 1] to [DISC 5], to produce an all disc digest video obtained by pasting the replay video, etc. from the respective discs on predetermined display areas AR1 to AR5. The all disc digest video thus produced on the monitor unit.

Figure 27:
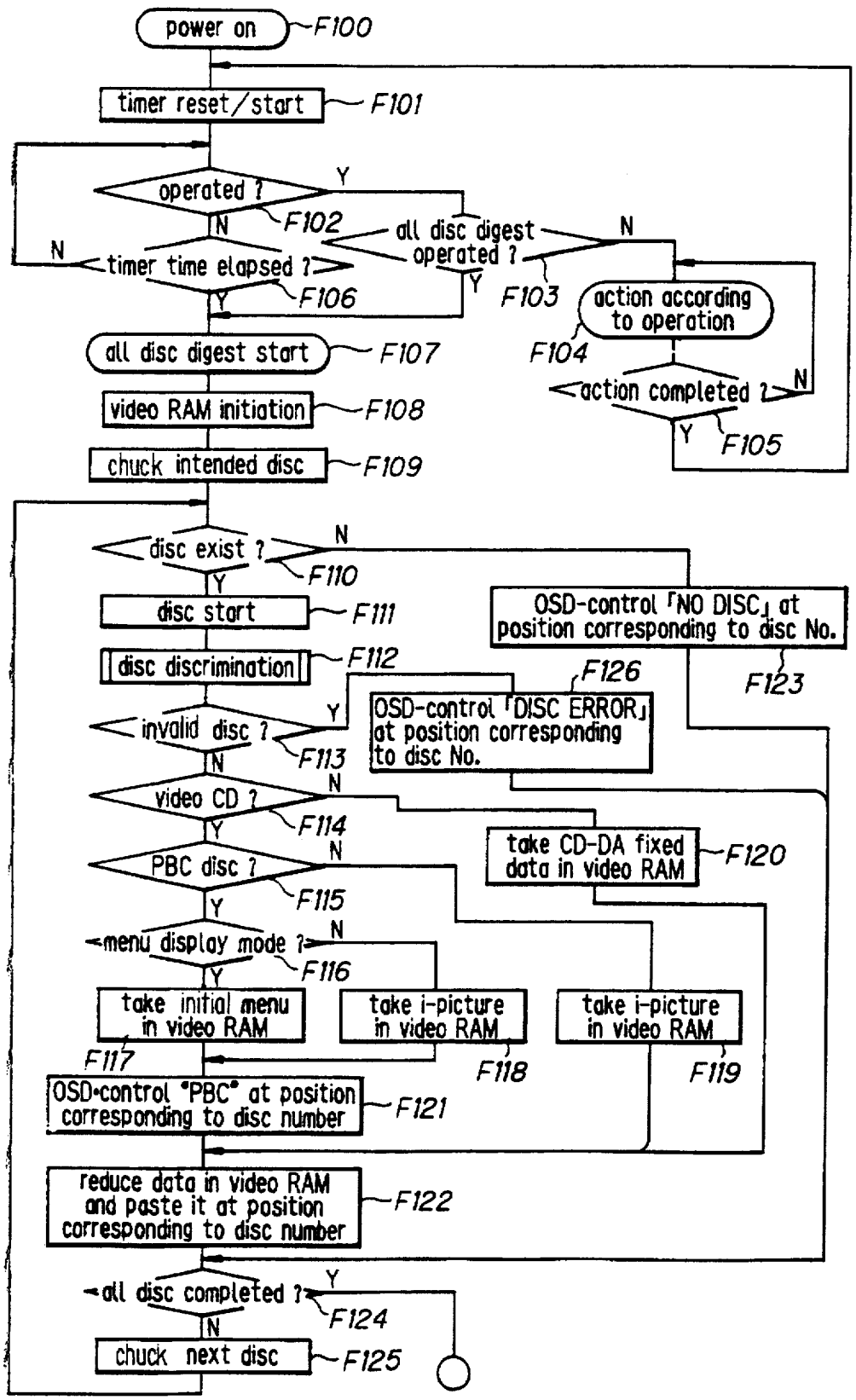
FIG. 27 is a processing flowchart for providing an all disc digest display in accordance with one embodiment of the invention.

FIG. 27 shows the processing of the system controller 53 for the all disc digest display.

Upon turning power on (F100), the system controller 53 first resets its internal timer and allows the timer to start the counting operation (F101). The function of the timer is to discriminate the execution of the all disc digest operation. If time set by the timer elapsed without conducting any operation by the user in a state where power is on, the all disc digest operation is automatically started (F102, F106 and F107 in the stated order).

In the case where any operation has been conducted before the timer expires, it is first discriminated whether it is the all disc digest operation, or not (F103). The all disc digest operation means a case in which the user depresses the digest key 20. If the user depresses the digest key 20 the user requests the all disc digest operation, and therefore the all disc digest operation starts (F103–F107).

In the case where the foregoing operation is another operation such as disc selection, a required processing is executed in accordance with that operation (F104), and upon the completion of that processing, the operation returns to Step F101. In other words, in this embodiment, when the user conducted the all disc digest operation, or when a predetermined period of time elapsed without conducting any operation, the all disc digest operation is started.

Upon the start of the all disc digest operation (F107), the system controller 53 first initializes the video RAM 43 (F108). Then, arbitrary disc on the disc tray 30 is chucked (F109). The chucking may be conducted on the disc which is loaded on the receiver $30_x$ nearest to the optical head 34 at that time.

Subsequently, it is discriminated whether the disc exists in the receiver $30_x$, or not (F110). The presence/absence of the disc may be detected by a sensor disposed at the loading position. Alternatively, although the processing order is reversed in the flowchart shown in the figure, after the disc is started, it is discriminated whether the TOC data is read to determine the presence/absence of the disc.

If the disc exists therein and the chucking is completed, the disc is started (F111). In other words, while the spindle motor 33 is started to rotate the disc, the irradiation of a light beam on disc from the optical head 34 is started. Then, on the basis of information read from the disc at this time, the disc is discriminated (F112).

Figure 28:
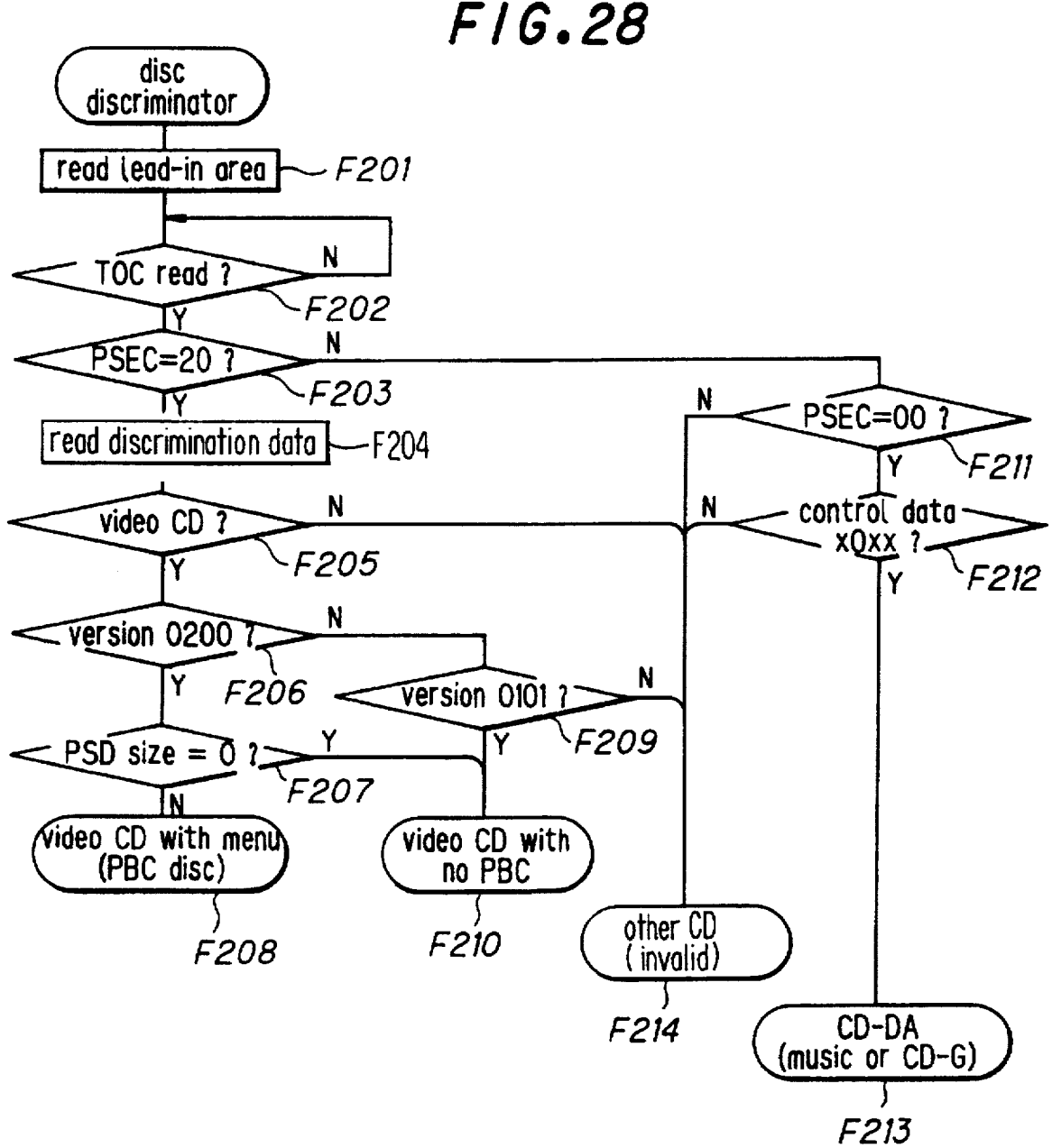
FIG. 28 is a processing flowchart for discriminating a disc in accordance with the embodiment of the invention.

The discrimination of the disc is performed according to the processing shown in FIG. 28.

First, the lead-in area data of the disc is replayed, and the TOC data is read in (F201, F202). In this situation, as described in FIG. 7, if PSEC=[20] in a block where POINT is [A0], the disc is CD-ROM of the XA type. On the other hand, if PSEC =[00], the disc is CD-DA whereas, if PSEC= [10], it is CD-I.

Therefore, PSEC of the block where POINT is [A0] is confirmed (F203), and if PSEC is [20], and the disc is the CD-ROM of the XA type, the operation proceeds to Step F204. Then, data of the disc information from the absolute time address 00:04:00 is read in. In the disc information shown in FIGS. 10A and 10B, if [VIDEO CD] has been recorded in the head system recognitor, it is discriminated that the disc is the video CD. In this case, the operation proceeds from Step F205 to F206. Then, a version No. subsequent to the system recognitor is recognized.

If the version No. is [$0200], the disc as used is the version 2.00. In this case, there is a probability that the playback control function is added to the disc. For that reason, data of the PSD size at the 45th to 48th bytes of the disc information is confirmed in Step F307. As described above, in the case of a disc providing the playback control function, the size of an PSD area is indicated, and if no playback control function is added to the disc, the size of the PSD area is indicated as [0].

Therefore, if the size of PSD is not [0], it is discriminated that the disc is the video CD to which the playback control function is added (F208).

On the other hand, if the size of PSD is [0], it is discriminated that the disc is a video CD to which no playback control function is added (F208).

Also, if version No. is [$0101] in Step F206, the disc is the version 1.01. In this case, it is discriminated that the disc is a video CD to which no playback control function is added (F210).

If it is determined that PSEC is not [20] in Step F203, is recognized that PSEC is [00] or not in Step F211. Further, it is confirmed whether control data ($Q_1$ to $Q_4$) within sub Q-data is [x0xx] or not in Step F212. If the affirmative results are obtained in Steps F211 and F212, it is discriminated that the disc is CD-DA (F213).

If a negative result is obtained in any one of Steps F211, F212, F205 and F209, because the disc is another type which is not applicable to the replay apparatus of this embodiment, it is judged that the disc is invalid (F214).

In Step F112 of FIG. 27, after the discrimination of the disc has been conducted according to the processing shown in FIG. 28, the processing is branched in Steps F113 to F115. Then, if there is an invalid disc, it is judged that no disc has been loaded.

If the disc is the video CD and also the video CD with playback control, the operation proceeds to Step F116 where it is discriminated whether it is a menu display mode or not.

With this structure, in the disc having playback control, the user can selectively use the menu video as an all disc digest display or use i-picture within a track. That mode is previously selected by the user through the digest menu key 21.

If it is the menu display mode, the operation proceeds to Step F117, and initial menu video data is read out from that disc and inputted in the video RAM 43. The initial menu video data is directed to video data of the segment play item designated by the selection list where the list ID is [1] or the play list.

On the other hand, if it is not the menu display mode, an i-picture is taken (F118). This is normally the first i-picture of the track #2. However, it may be not the first i-picture of the track, but an i-picture which is data after 2 to 3 seconds within the track. Also, it is not limited to the track #2, but a specified i-picture may be selected within the disc.

In Step F117 or F118, the typical video data representing the contents of the disc is obtained from the disc with playback control. Thereafter, in Step F121, it is controlled so that the character [PBC] indicating that it is the disc with playback control is OSD-displayed at a position corresponding to the disc within the all disc digest video data.

Then, in Step F122, the system controller 53 image-reduces data of the read initial menu video or an i-picture with the thinning-out of predetermined pixels, etc. Then, the video data is pasted at a position ARx corresponding to No. of the disc which is now being read in the video RAM 43. Because the data of the video RAM 43 is outputted as is, the reduced image appears at a predetermined display position ARx in the monitor unit when the paste processing is conducted.

On the other hand, in Step F115, if the disc to be read is the video CD but without the playback control function, the typical i-picture is taken from the disc (F119). Similarly, it may be the first i-picture of the track #2. Alternatively, it may be not the first i-picture of the track, but an i-picture which is data 2 to 3 seconds within that track. Then, the operation proceeds to Step F122, the system controller 43 reduces the read i-picture data and makes the video data pasted at the position ARx corresponding to No. of the disc which is now being read in the video RAM 43.

Further, if the disc is CD-DA, the operation proceeds from Step F114 to Step F120. In this case, because no video data exists in the disc, the system controller 53 transmits the fixed image data for CD-DA which is held in its internal ROM to the video RAM 43. Thereafter, the operation proceeds to Step F122, in which the fixed video data is pasted at the position ARx corresponding to No. of the disc which is now being read in the video RAM 43.

In the case where no disc has been loaded therein, the operation proceeds to Step F123. In this situation, the system controller 53 gives an instruction to the OSD processor 50 so that the display of [NO DISC] is executed at the display position ARx corresponding to the receiving position (disc No.) in question on the all disc display video.

Other display states such as a so-called blue-screen display may be applied instead of the display of [NO DISC].

If the disc is invalid, the operation proceeds to Step F126, and the system controller 53 gives an instruction to the OSD processor 50 so that the display of [DISC ERROR] or the like is executed at the display position ARx corresponding to the receiving position (disc No.) in question on the all disc digest display video. As in the case where no disc has been loaded, in the case of the invalid disc, the operation proceeds as from Step F123.

After the completion of the foregoing processing for a certain disc, the next disc is subsequently chucked in Step F125. In other words, the rotary table 30a of the disc tray 30 is rotated, and a disc in the next receiver $30_{x+1}$ is loaded. Then, the processing of Step F110 and the subsequent steps is repeated.

At the time when the processing of Step F110 and the following steps is completed for five discs (receivers $30_1$ to $30_5$) (F124→YES), the all disc digest video, for example, as shown in FIG. 24 is outputted to the monitor unit connected to the apparatus.

FIG. 24 shows all disc digest display in the case where the video CDs with the playback control function are loaded on the receivers $30_1$ and $30_3$, the video CD with no playback control function is loaded on the receiver $30_2$, the CD-DA is loaded on the receiver $30_5$, and no disc is loaded on the receiver $30_4$. The digest display mode is the case where the menu display mode is set.

For that reason, the initial menu video read from the respective discs is displayed at the display positions AR1 and AR3 in correspondence with the discs on the receivers $30_1$ and $30_3$, that is, [DISC 1] and [DISC 3]. Furthermore, in order to indicate that the disc is the video CD with the playback function, the character [PBC] is OSD-displayed in the vicinity of the display positions AR1 and AR3.

Also, the video as the i-picture is displayed at the display position AR2 in correspondence with the disc of the receiving position $30_2$, that is, [DISC 2].

Further, [NO DISC] is displayed at the display position AR4 with respect to [DISC 4], and a fixed video indicating that [DISC 5] is the CD-DA and a music disc is displayed at the display position AR5.

Thus, with the execution of the all disc digest display, the user can recognize the respective discs at a glance. For that reason, for example, in viewing the all disc digest display, the user can recognize No. of the disc to be replayed to conduct the replay by selecting that disc through the disc selection key 9. Hence, such a complicated operation as the replay of respective discs to search for a desired disc because No. of the disc to be replayed is not known becomes unnecessary.

In addition, because the all disc digest display is performed not only in the case that the all disc digest display is requested by the user, but also in the case that it is automatically conducted in a state where no operation is conducted, the user can recognize the particular contents of the discs even without conducting the digest operation.

Figure 25:
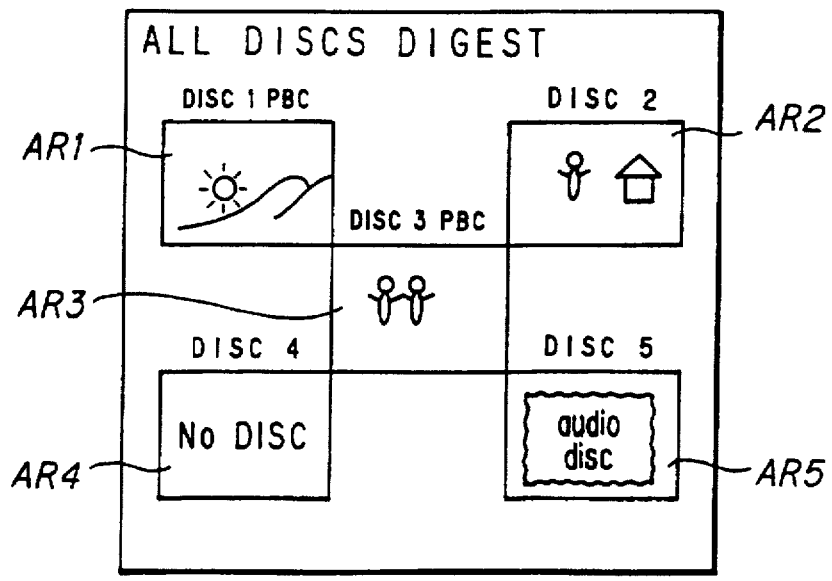
FIG. 25 is an explanatory diagram showing an all disc digest display in accordance with another embodiment of the invention.

In the meantime, if the digest mode is a no menu display mode, the all disc digest mode becomes as shown in FIG. 25. In other words, even in the case of [DISC 1] and [DISC 3] which represent the PBC disc, the i-picture is displayed. In this case, whether it is the PBC disc or not is distinguished by the OSD display of [PBC]. The display indicating that it is the PBC disc is not limited to the character [PBC], but, other characters or symbols may be used therefor.

In the case where the user wishes to display the i-picture in the all disc digest display even in the PBC disc, such a display can be performed as shown in FIG. 25 by activating the digest mode key 21. Thus, this embodiment can cope with the user demand.

2. Second Example of Operation Processing

Subsequently, a second example of the all disc digest display operation will be described.

The difference of this operation example from the foregoing first operational example first resides in that a menu video is necessarily displayed for the disc with the playback control function. Also, in the case where the disc is the CD-DA, there is a case where it may be the CD-G according to the circumstances. Therefore, in the case of the CD-G, the all disc digest is produced using still image data. In the case of the CD-G, in order that the all disc digest is produced using still image data, the circuit block shown in FIG. 23 need to be modified somewhat. In other words, the circuit structure is modified so that the output of the CD-G decoder 52 can be inputted to the video RAM 43 (see FIG. 23).

Figure 29:
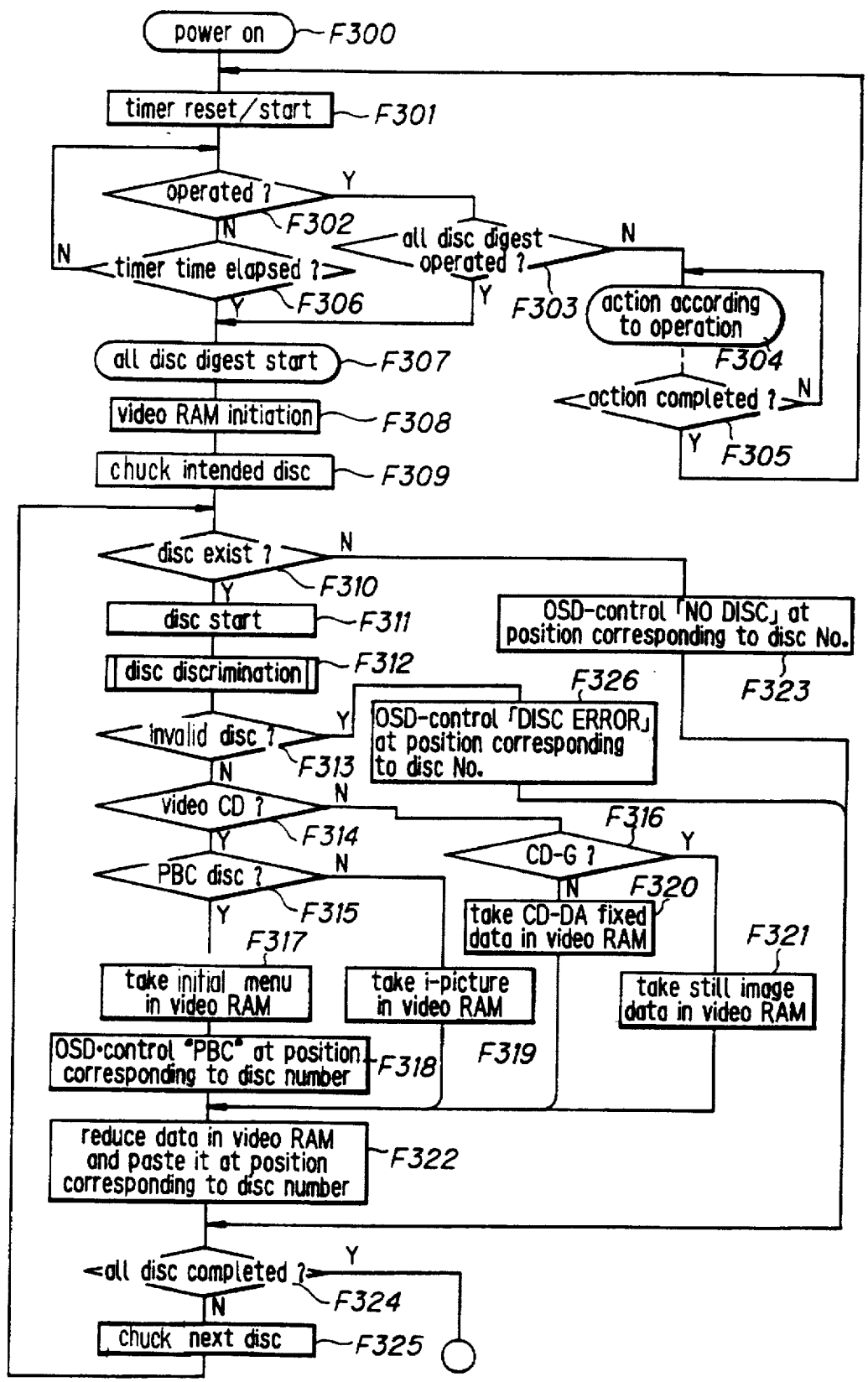
FIG. 29 is a processing flowchart for providing an all disc digest display in accordance with another embodiment of the invention.

FIG. 29 shows the processing of the system controller 53 for the all disc digest in accordance with the second operational example.

In this example, because the processing of Steps F300 to F312 is identical to the processing of Steps F100 to F112 in FIG. 27, they are shown in the figure, but its description will be omitted here.

In Step F312 of FIG. 29, if the discrimination of the disc has been conducted in the foregoing processing of FIG. 28, the operation is branched in Steps F313 to F316. Then, if the disc is invalid, it is determined that no disc is mounted.

If the disc is the video CD and also the video CD with the playback control function, the operation proceeds from Step F315 to F117 where the initial menu, video data is read out from that disc and input into the video RAM 43. The initial menu video data is directed to video data of the segment play item designated by the selection list where the list ID is [1] or the play list.

In Step F317, the typical video data representing the contents of the disc is taken from the disc with the playback control function. Thereafter, in Step F318, it is controlled so that the character [PBC] indicating that it is the disc with the playback control function is OSD-displayed at a position corresponding to the disc within the all disc digest video data.

Then, in Step F322, the system controller 53 image-reduces data of the read initial menu video data with the thinning-out of predetermined pixels, etc. Then, the video data is pasted at a position ARx corresponding to No. of the disc which is now being read in the video RAM 43. Because the data of the video RAM 43 is outputted as is, the reduced image appears at a predetermined display position ARx in the monitor unit when the paste processing is conducted.

On the other hand, in Step F315, if it is judged that the disc to be read is the video CD but without the playback control function, the typical i-picture is taken from the disc (F319). That is, the first i-picture of the track #2, or an i-picture which is data after 2 to 3 second on the track #2 is taken in. Then, the operation proceeds to Step F322, the system controller 43 reduces the read i-picture data and makes the video data pasted at the position ARx corresponding to No. of the disc which is being read into the video RAM 43.

Further, if the disc is CD-DA, it is discriminated whether the disc is CD-G or not in Step F316. In this decision, the track is actually replayed, and it is discriminated whether the still image data has been recorded in the R to W channels as the sub-code data, or not.

Then, if the disc is not the CD-G but the normal CD-DA for use in music, the operation proceeds to Step F320. In this case, because video data has not been recorded in the disc at all, the system controller 53 transmits fixed image data for CD-DA held in its internal ROM to the video RAM 43. Subsequently, the operation proceeds to Step F322, and the fixed video data is pasted at the position ARx corresponding to No. of the disc which is being read into the video RAM 43.

In the case where no disc has been loaded therein, the operation proceeds to Step F323. In this situation, the system controller 53 gives an instruction to the OSD processor 50 so that the display of [NO DISC] is executed at the display position ARx corresponding to the receiving position (disc No.) in question on the all disc digest display video.

If the disc is invalid, the operation proceeds to Step F326, and the system controller 53 gives an instruction to the OSD processor 50 so that the display of [DISC ERROR] or the like is executed at the display position Arx corresponding to the receiving position (disc No.) in question on the all disc digest display video. As in the case where no disc has been loaded, in the case of the invalid disc, the operation proceeds as from Step F323.

After the completion of the foregoing processing for a certain disc, the next disc is subsequently chucked in Step F325. In other words, the rotary table 30a of the disc tray 30 is rotated, and a disc in the next receiver $30_{x+1}$ is loaded. Then, the processing of Step F110 and the subsequent steps is repeated.

With the foregoing processing, at the time when the processing of Step F110 and the following steps is completed for five discs which have been mounted on and received in the receivers $30_1$ to $30_5$ respectively (F124→YES), the all disc digest video, for example, as shown in FIG. 24, is outputted to the monitor unit connected to the apparatus, as in the foregoing first operational example.

However, in FIG. 24, it is displayed at the display position AR5 that [DISC 5] is the audio disc. However, in the case of the operational example shown in FIG. 29, if [DISC 5] is CD-G, the still image read from the CD-G is displayed.

Also, in the case of this operational example, because the menu video display is necessarily conducted with respect to the PBC disc, it does not become the display state shown in FIG. 25.

Even in this case, with the execution of the all disc digest display, the user can recognize the respective discs at a glance. In particular, the user can recognize the respective discs even in the CD-G.

The all disc digest operation of the embodiment was described above. However, it goes without saying that a variety of modified examples may be considered as the all disc digest operation in the present invention.

For example, the layout of the display positions AR1 to AR5 corresponding to the respective discs on the all disc digest display can be modified. Further, there is a case where the number of discs receivable by the replay apparatus becomes 4 or less, or 6 or more. However, it goes without saying that the layout of the all disc digest display is set in accordance with the number of the receivable discs.

Furthermore, the operation of the all disc digest was described above. However, in the substantially same manner, as shown in FIG. 26A, the head i-picture of each track of a single disc is read out so that the disc digest screen is displayed, or as shown in FIG. 26B, some i-pictures may be read out from a certain track to conduct the digest display so that the contents of tracks can roughly be known.

[V. Fast Forward Operation at the time of All Disc Digest Display]

1. First Example of Operation Processing

Subsequently, a fast forward operation when conducting the all disc digest display as described above will be described.

With the all disc digest display, the user can easily know which disc has been loaded in each of the receivers $30_1$ to $30_5$ in the rotary table 30a of the disc tray 30. In addition, there is a case where the user wants to know the contents of the respective discs in detail to some degree.

In view of the above, in this embodiment, when the all disc digest display is conducted, a fast forward replay is executed on the respective discs or a specified disc, so that the fast forward video is displayed within the all disc digest display.

A first example of the fast forward operation at the time of the all disc digest display will be described with reference to FIGS. 30 to 32.

Figure 30:
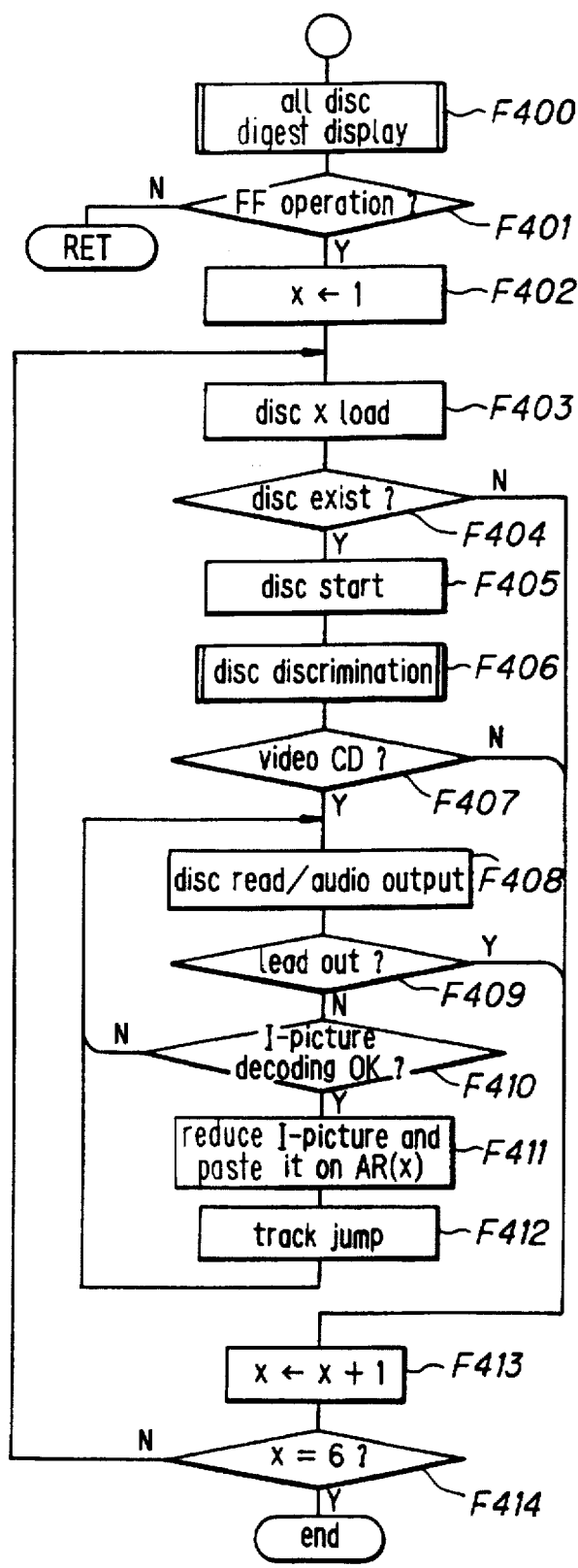
FIG. 30 is a processing flowchart for conducting a fast forwarding operation at the time of the all disc digest display.
Figure 31A:
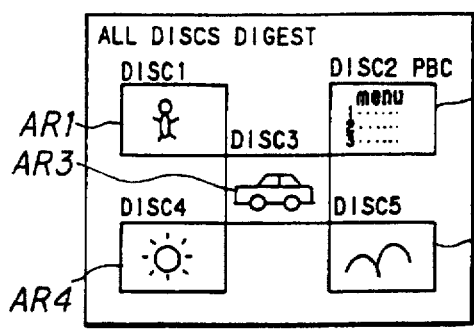
FIGS. 31A to 31H are explanatory diagrams showing the fast forwarding operation at the time of the all disc digest display in accordance with one embodiment of the invention.

Now, it is assumed that five video CDs are received in the replay apparatus 1, and display shown in FIG. 31A is executed on the monitor unit with the foregoing all disc digest operation. This state is indicated as Step F400 in FIG. 30.

In this situation, if the user conducts the fast forward operation, the processing of the system controller 5 proceeds from Step F400 to F402 through F401 in FIG. 30.

For example, the forward head positioning key 11 may be used as the operation key for the fast forward operation in this case. Also, even without conducting the fast forward operation, the all disc digest display is conducted, and after a predetermine period of time elapses, the operation may be advanced to the processing starting from Step F402. In Step F402, a variable x is first set to 1. Then, the disc mounted on the receiver $30_x$ is loaded (F403). Accordingly, the first disc mounted on the receiver $30_1$ is first loaded.

In this situation, it is discriminated whether a disc exists in the receiver $30_x$ or not (F404), and if a disc exists therein, that is, when the loading of the disc is enabled, the disc is started (F405). The presence/absence of the disc may be detected by a sensor disposed at the loading position. Alternatively, although the processing procedure is reversed in the flowchart shown in the Figure, after the disc is started, it is discriminated whether the TOC data is read or not, to judge the presence/absence of the disc. If there is no disc, the operation proceeds to Step F413, thereby shifting the operation to the processing for the next disc.

In the processing of starting the disc in Step F405, while the spindle motor 33 is started to rotate the disc, the irradiation of a light beam on disc from the optical head 34 is started. Then, on the basis of information read from the disc at this time, the disc is discriminated (F405). The discrimination of the disc is conducted with the foregoing processing of FIG. 28.

After the discrimination of the disc has been conducted in the processing of FIG. 28, the operation proceeds to Step F407, and if the disc is the video CD, the operation proceeds to Step F408, thereby executing the reading of data from the disc. The data reading is a process of the fast forward replay. If it is not the video CD, the operation proceeds to Step F413, thereby shifting the operation to the processing for the next disc.

Figure 32:
FIG. 32 is an explanatory diagram showing the fast forwarding replay operation in accordance with one embodiment of the invention.

Regarding the fast forward replay from Step 408, the system controller 53 executes the access operation schematically shown in FIG. 32 as the operation of the optical head 34.

At the time of the fast forward replay, the discrete i-picture is extracted from the disc and then displayed. For that reason, the i-picture is retrieved from the disc 30 by executing the normal replay operation as shown in FIG. 32. Then, if the i-picture is found, it is decoded by the MPEG video decoder 42, and the optical head 34 is made to conduct the track jump over several tracks. After the completion of the track jump, the normal replay operation is executed to retrieve the i-picture. Such an access operation is repeated to execute the fast forward replay.

The operation of reading the disc data in Step F408 is the operation for retrieving the i-picture. At the time of the reading operation, the reading is conducted as in the normal replay operation. For that reason, until finding the i-picture, the audio sector A shown in FIG. 4B can also be read out. Accordingly, audio data read out from the audio sector A is outputted from the MPEG audio decoder 40 through the switch 44 and the D/A converter 45. As a result, the audio output can be obtained at a normal speed although it is discrete at the time of the fast forward.

If the i-picture is found during the reading operation and can be decoded by the MPEG video decoder 42, the operation proceeds from Step F410 to F411. The system controller 53 image-reduces the decoded i-picture data with the thinning-out of predetermined pixels, etc. Then, the video data is pasted at a position ARx corresponding to No. of the disc which is now being read in the video RAM 43. Because the data of the video RAM 43 is outputted as is, the reduced image appears at the display position ARx in the monitor unit when the paste processing is conducted.

Figure 31E:
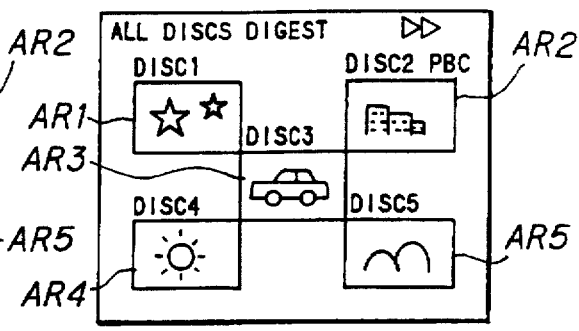
Figure 31B:
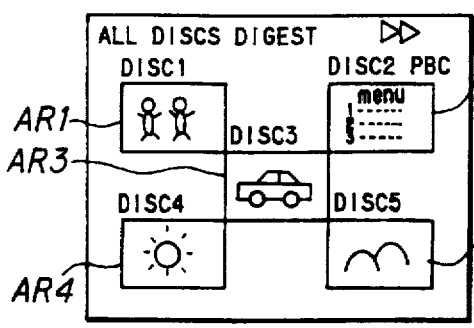

Because the first processing is for the first disc, the reduced video data is pasted at the display position AR1, whereby the all disc digest video shown in FIG. 31A is changed as shown in FIG. 31B.

Subsequently, the system controller 53 makes the optical head 34 execute the track jump over a predetermined number of tracks, and after the completion of the track jump, the operation returns to Step F408, thereby again executing the reading of the next i-picture and an audio output.

If the i-picture can be decoded, likewise the operation proceeds to Step F411 where the i-picture data is reduced and pasted at the display position AR1. As a result, the all disc digest video is changed as shown in FIG. 31C.

Similarly, the track jump and the reading operation are repeated, and the processing of reducing the read i-picture data and pasting it at the display position AR1 is repeated (F408 to F412). With the foregoing operation, the all disc digest video is changed in the stated order of FIG. 31A, FIG. 31B, FIG. 31C, . . . , and FIG. 31D.

In other words, only the display position AR1 corresponding to the first disc is outputted as the fast forward video from the first disc. Also, the audio of the normal speed is discretely replayed and outputted simultaneously. As a result, the user can know the contents of the first disc in more detail in a short time. In this situation, the video is not changed at the display positions AR2 to AR5 corresponding to the second to fifth discs.

Figure 31F:
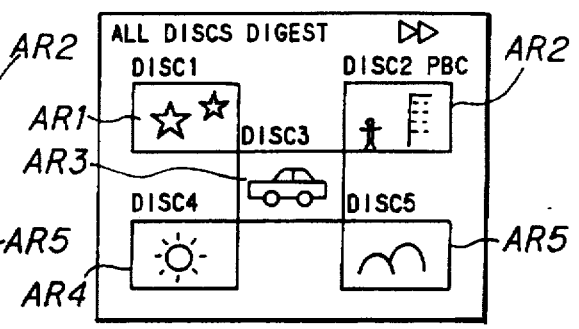
Figure 31C:
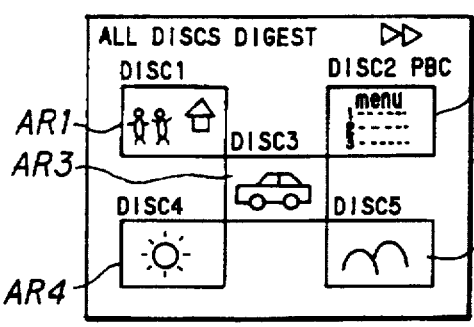
Figure 31G:
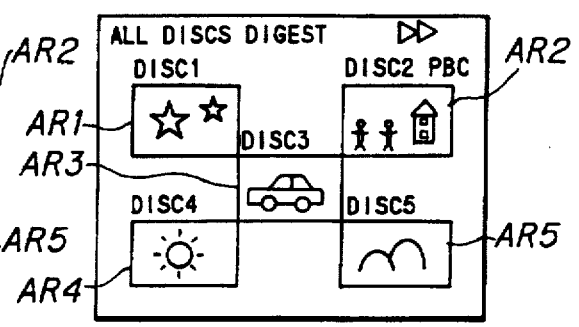
Figure 31D:
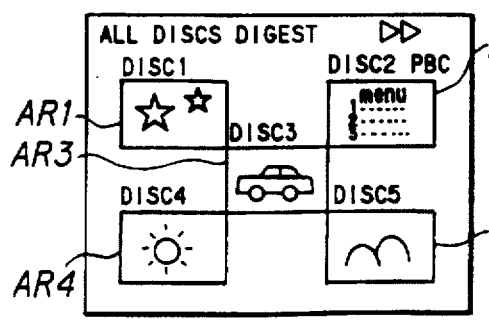

In the processing of Steps F408 to F412, it is assumed that the fast forward replay is executed for the first disc, its fast forward video is displayed at the display position AR1, and immediately after it comes to a state shown in FIG. 31D, the reading of data through the optical head 34 reaches the lead-out, that is, the fast forward replay of the first disc is completed. Then, the processing proceeds to Step F409 to F413, thereby making an increment of the variable x. If the variable x is not 6, the processing returns to Step F403. In other words, in the case where the fast forward replay of the first disc is completed, the variable x=2, and the second disc received in the receiver 302 of the rotary table 30a becomes loaded.

Then, the same processing as in Step F404 and the following steps is executed on the second disc, whereby the all disc digest video is changed from the state shown in FIG. 31D to the state of FIG. 31E, and further from FIG. 31F to FIG. 3G. In other words, the final picture from the first disc is fixedly displayed at the display position AR1, and the fast forward video is displayed at the display position AR2 corresponding to the second disc.

Figure 31H:
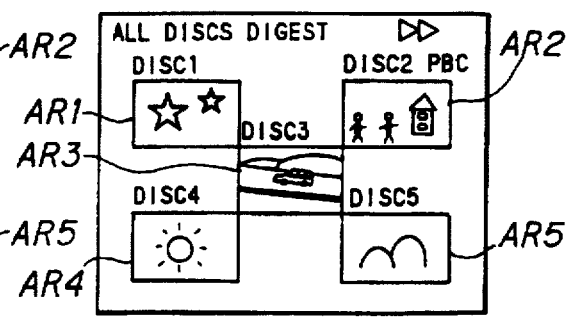

Further, upon the completion of the fast forward replay of the second disc in a state of FIG. 31G, the variable x is subjected to increment in Step F413, and the third disc mounted on the receiver is loaded while the rotary table 30a is rotated in Step F403. Then, likewise, the fast forward reply is executed for the third disc with the processing of Step F404 and the following steps, and the fast forward video is displayed at the display position AR3 corresponding to the third disc as shown in FIGS. 31G to 31H. The final video of the second disc is fixed to the display position AR2.

The foregoing operation is sequentially executed on fourth and fifth discs, and the respective fast forward video is displayed at the display positions AR4 and AR5.

Thus, with the execution of the fast forward replay display of the respective discs within the all disc digest display, the user can know the contents of the respective discs in more detail in a short time. As a result, the operation for selecting the disc to be replayed is also facilitated.

In the operational example of FIG. 30, the fast forward replay is executed only when the disc is the video CD. Even in the CD-G, the fast forward replay may be executed similarly. Even in the case of CD-DA with only audio data, video is fixed to, for example, video indicated at the display position AR5 shown in FIG. 24, and only audio may be outputted by the fast forward replay.

Also, in the foregoing embodiment, audio data which can be read from the disc at the time of the fast forward replay of the video CD is also outputted. Alternatively, the output of the audio data may not be conducted.

Furthermore, in the foregoing embodiment, the fast forward replay is executed for the respective discs until reaching the lead-out. However, when the fast forward replay is conducted until the middle of the disc, then the replay may be shifted to the next disc.

Further, the operation may be shifted to the fast forward replay of the next disc during the fast forward replay of one disc on the basis of the user operation. For example, in the case where the user understands the contents of the disc only by watching a fast forward screen of a certain degree, the contents of the respective discs can be more rapidly confirmed by shifting the operation to the fast forward of the next disc without requiring the fast forward of one disc to go to the last operation.

Also, the fast forward replay speed may be changed by the user.

2. Second Example of Operation Processing

Next, a second example of the fast forward operation at the time of the all disc digest display will be described.

In the foregoing first example, the fast forward replay is continuously executed on all the discs received in the apparatus. In this second example, the user who watches the all disc digest video selects a specified disc from them so that only the selected disc outputs the fast forward video. In other words, the user selects only a disc which the user wishes to confirm the contents thereof in detail so as to enable the fast forward replay within the all disc digest video.

Figure 33:
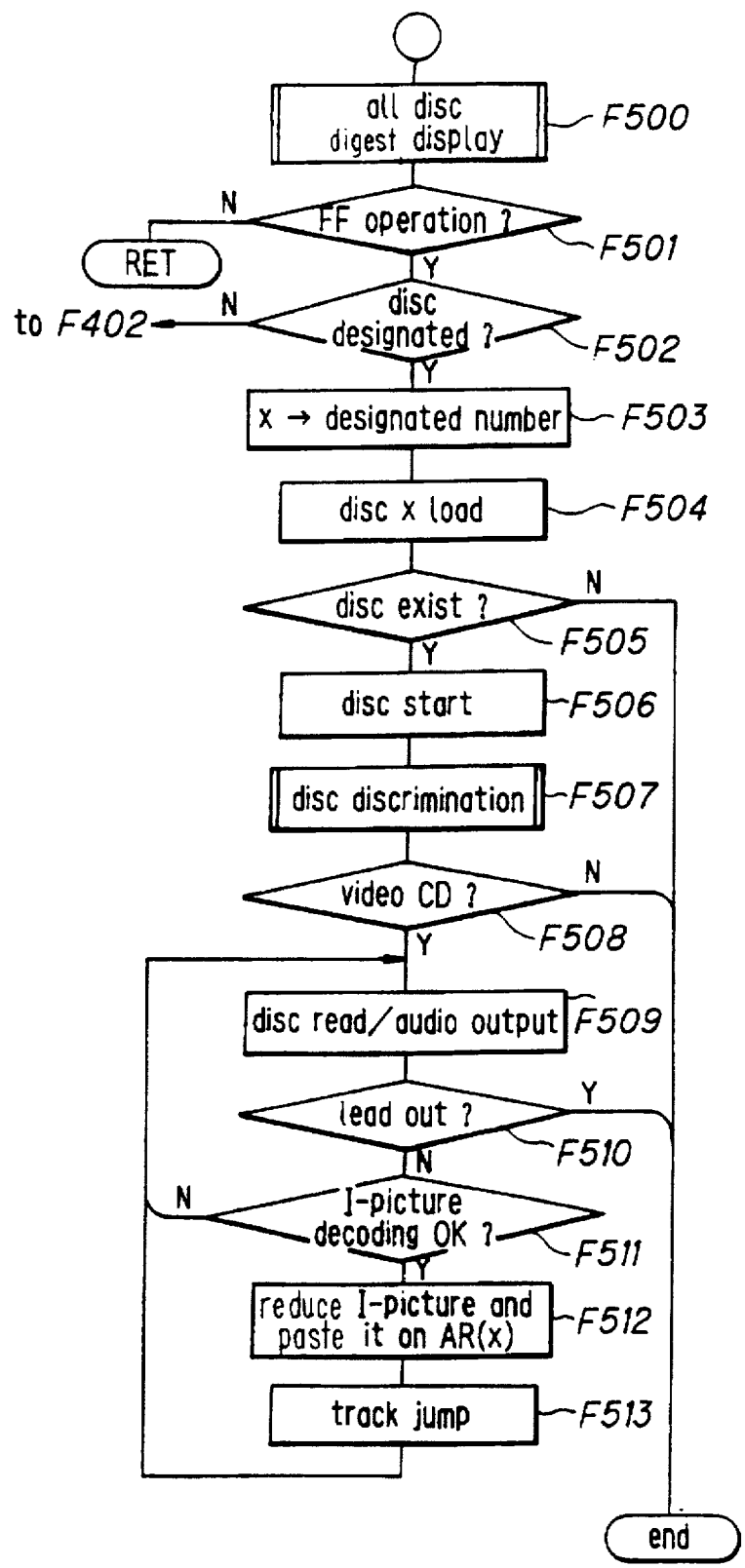
FIG. 33 is a flow chart showing the processing of the system controller for conducting a fast forwarding operation at the time of the all digest display in accordance with a second example of the invention.

FIG. 33 show the processing of the system controller 53 for the fast forward operation at the time of the all disc digest display in accordance with the second embodiment.

During the execution of the all disc digest display (F500), the user can not only conduct the fast forward operation but also select a disc to be forwarded fast. For example, after depressing the forward head positioning key 11, a disc to be fast forwarded is selected using the disc selection key 9 or the like.

The processing of the system controller 53 proceeds from Step F501 to F502 when the fast forward operation has been conducted, and proceeds to Step F402 shown in FIG. 30 if the selection of a disc has not been conducted. In other words, the processing is shifted to the processing in the first operational example.

If the disc has been selected, the processing proceeds to Step F503 whereby a selected No. (disc No.) is set to the variable x. For example, an explanation is given provided that the third disc mounted on the receiver $30_3$ of the rotary table 30a where x=3 has been selected.

Subsequently, the third disc, which has been mounted on the receiver $30_x$, that is, the receiver $30_3$, is loaded by the rotary table 30a (F504).

Then, in the processing of Steps F505 to F513, the disc is subjected to the processing identical to that of Steps of F404 to F412 of FIG. 30.

The respective processing of Steps F505 to F513 are identical to those described with reference to FIG. 30. Therefore, their detailed description will be omitted. That is, in this case, the fast forward replay is executed on the third disc selected, and the i-picture data sequentially read out is reduced and pasted at the display position AR3.

As a result, in the all disc digest video, only the display position AR3 is displayed as the fast forward replay video from the third disc, and the display positions AR1, AR2, AR4 and AR5 remain fixed. If the disc reaches the lead-out (F510), the processing is completed.

According to this operational example, the user can conduct the fast forward replay of only the disc which he wishes to confirm the contents thereof in detail within the all disc digest video. The fast forward replay is not executed on the disc which the user need not watch. This results in such an advantage that the contents of a desired disc can be confirmed in a shorter time.

In the example shown in FIG. 33, the fast forward replay of the video or audio may be conducted even though the disc selected by the user is not only the video CD but also CD-G or CD-DA with only audio data.

Further, the fast forward replay need not be executed until the designated disc reaches the lead-out. That is, when the fast forward replay is conducted until the middle of the disc, the fast forward replay may automatically be completed, or the fast forward replay may be completed on the basis of the user operation. Also, the fast forward replay speed may be changed by the user.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments where chosen and described in order to explain the principles of the invention and its principal application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for replaying a disc whose contents include video data or audio data selectively recorded on said disc and having discrimination data thereon for indicating a disc type, said apparatus comprising:

receiving means for substantially concurrently receiving a plurality of discs including said disc;

reading means for selectively reading said video or audio data and said discrimination data sequentially from said discs; and display producing means having a display screen for substantially concurrently providing, based on said video or audio data sequentially read from each disc in said plurality of discs, a plurality of graphics images including a series of Intra-pictures at corresponding predetermined display positions on said screen to indicate the contents of each disc.

2. An apparatus according to claim 1, further comprising discrimination means for processing said discrimination data, said disc selectively including menu data for enabling playback of said video or audio data from a menu-selected position on said disc such that if said discrimination means determines that said disc has said menu data, said display producing means displays said menu data as an image in said plurality of graphics images at the corresponding display position.

3. An apparatus according to claim 2, wherein said display producing means displays said discrimination data with said menu data at the corresponding display position.

4. An apparatus according to claim 2, wherein if said menu data is not present, said reading means reads, from a predetermined position on said disc, said video data, such that the read video data is displayed by said display producing means as another image in said plurality of graphics images.

5. An apparatus according to claim 2, wherein said disc selectively includes still picture data such that if said discrimination means determines that said disc has said still picture data, said display producing means compresses said still picture data for display as an image in said plurality of graphics images.

6. An apparatus according to claim 1, further comprising discrimination means for processing said discrimination data and memory means for pre-storing image data, wherein if said discrimination means determines that said disc has audio data only, said pre-stored image data is read out from said memory by said reading means and is displayed, by said display producing means, as an image in said plurality of graphics images to indicate that said audio data is present on said disc.

7. An apparatus according to claim 1, further comprising control means for controlling said reading means to access said disc in a radial direction to perform a fast forward operation of replaying said disc such that said video or audio data is displayed, by said display producing means, as an image in said plurality of graphics images during said fast forward operation.

8. An apparatus according to claim 7, wherein said display producing means displays said image during said fast forward operation while displaying the contents of another disc as a stationary image in said plurality of graphics images.

9. An apparatus according to claim 8, wherein said control means is operative to vary a replay speed of said fast forward operation.

10. An apparatus according to claim 1, wherein said display producing means selectively provides alternative plural graphics images at the corresponding predetermined display positions on said screen to indicate the contents of data portions on a single disc in said plurality of discs.

11. An apparatus according to claim 1, wherein said video and audio data is compression-coded.

12. An apparatus for replaying a recording medium whose contents include different types of data selectively recorded on said recorded medium and having discrimination data thereon for indicating a data format recorded on said recording medium, said apparatus comprising:

receiving means for substantially concurrently receiving a plurality of recording media, including said recording medium, of substantially the same physical configuration;

reading means for selectively reading said different type data and said discrimination data sequentially from said recording media; and display producing means having a display screen for substantially concurrently providing, based on said different type data sequentially read from each recording medium in said plurality of recording media, a plurality of graphics images including a series of Intra-pictures at corresponding predetermined display positions on said screen to indicate the contents of each recording medium.

13. An apparatus according to claim 12, further comprising discrimination means for processing said discrimination data, said recording medium selectively including menu data for enabling playback of said different type data from a menu-selected position on said recording medium such that if said discrimination means determines that said recording medium has said menu data, said display producing means displays said menu data as an image in said plurality of graphics images at the corresponding display position.

14. An apparatus according to claim 12, wherein said different type data is compression-coded.

* * * * *

UNITED STATES PATENT AND TRADEMARK OFFICE
CERTIFICATE OF CORRECTION

PATENT NO. : 5,701,385
DATED : December 23, 1997
INVENTOR(S) : Akira KATSUYAMA, et al.

It is certified that error appears in the above-identified patent and that said Letters Patent is hereby corrected as shown below:

After "[22] Filed: Jul. 3, 1995"

PLEASE INSERT:

-- [30]   Foreign Application Priority Data

Jul. 4, 1994    [JP] Japan ........ 6-173171

Sept. 30, 1994 [JP] Japan ........ 6-259719 --

Signed and Sealed this

Seventeenth Day of March, 1998

Attest:

BRUCE LEHMAN

Attesting Officer        Commissioner of Patents and Trademarks